United States Patent
Suzuki

(10) Patent No.: US 9,757,863 B2
(45) Date of Patent: Sep. 12, 2017

(54) ROBOT APPARATUS, EXCHANGER APPARATUS AND ROBOT SYSTEM

(71) Applicant: CANON KABUSHIKI KAISHA, Tokyo (JP)

(72) Inventor: Masataka Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/001,902

(22) Filed: Jan. 20, 2016

(65) Prior Publication Data

US 2016/0221196 A1    Aug. 4, 2016

(30) Foreign Application Priority Data

Jan. 30, 2015 (JP) ................................. 2015-017010
Dec. 25, 2015 (JP) ................................. 2015-252967

(51) Int. Cl.
B25J 15/04 (2006.01)

(52) U.S. Cl.
CPC ....... *B25J 15/0475* (2013.01); *B25J 15/0425* (2013.01); *B25J 15/0491* (2013.01); *Y10S 901/02* (2013.01); *Y10S 901/39* (2013.01)

(58) Field of Classification Search
CPC .... B25J 15/04; B25J 15/0416; B25J 15/0425; B25J 15/0458; B25J 15/0475; B25J 15/0491; Y10S 483/901; Y10S 901/02; Y10S 901/39
See application file for complete search history.

(56) References Cited

U.S. PATENT DOCUMENTS

| | | | | |
|---|---|---|---|---|
| 4,510,684 A | * | 4/1985 | Hutchins | B25J 9/1612 29/703 |
| 4,913,617 A | * | 4/1990 | Nicholson | B25J 9/0084 294/86.4 |
| 5,127,029 A | | 6/1992 | Suzuki et al. | |
| 5,360,249 A | * | 11/1994 | Monforte | B25J 15/0475 294/119.1 |
| 5,993,365 A | * | 11/1999 | Stagnitto | B25J 15/0491 414/736 |
| 6,757,422 B1 | | 6/2004 | Suzuki et al. | |
| 6,856,341 B2 | | 2/2005 | Suzuki | |

(Continued)

FOREIGN PATENT DOCUMENTS

| | | |
|---|---|---|
| JP | 2009-125867 A | 6/2009 |
| JP | 2013-091121 A | 5/2013 |

*Primary Examiner* — Dean Kramer
(74) *Attorney, Agent, or Firm* — Fitzpatrick, Cella, Harper & Scinto

(57) ABSTRACT

A hand at a robot arm leading end is provided with a mounting portion for a finger. The mounting portion includes a guiding unit that guides a supported portion of the finger so as to enable the supported portion to pass through from one end part of the guiding unit 31 to another end part thereof. The mounting portion further includes a lock mechanism. The lock mechanism moves the supported portion from any of end parts of the guiding unit 31 toward a mount position between the end parts, to thereby bring the supported portion of the finger into a restricting state at the mount position. Moreover, the lock mechanism moves the supported portion toward any of the end parts from the restricting state, to thereby bring the supported portion from the restricting state into a releasing state.

16 Claims, 20 Drawing Sheets

(56) References Cited

U.S. PATENT DOCUMENTS

| | | | |
|---|---|---|---|
| 6,927,955 B2 | 8/2005 | Suzui et al. | |
| 7,008,362 B2 * | 3/2006 | Fitzgibbon | B23Q 3/15546 |
| | | | 483/12 |
| 8,322,766 B1 * | 12/2012 | Hsiung | B25J 11/0095 |
| | | | 294/213 |
| 8,454,486 B2 * | 6/2013 | Philippi | B25J 15/0491 |
| | | | 483/16 |
| 2003/0012425 A1 | 1/2003 | Suzuki et al. | |
| 2006/0270539 A1 * | 11/2006 | Hata | B25J 15/0491 |
| | | | 483/16 |
| 2009/0315281 A1 * | 12/2009 | Tuauden | B25J 15/0475 |
| | | | 279/142 |
| 2013/0245823 A1 * | 9/2013 | Kimura | B25J 5/02 |
| | | | 700/248 |
| 2014/0103674 A1 * | 4/2014 | Mueller | B65G 11/023 |
| | | | 294/106 |

* cited by examiner

ROBOT APPARATUS, EXCHANGER APPARATUS AND ROBOT SYSTEM

BACKGROUND OF THE INVENTION

Field of the Invention

The present invention relates to a robot apparatus, an exchanger apparatus and a robot system capable of exchanging an operating unit that operates an operating object.

Description of the Related Art

In recent years, work such as assembling and processing of industrial products having a small-size complicated structure, such as a camera and a printer, is automated. Components used for industrial products of this type are small-size precision components in many cases, and have a wide variety of shapes.

Meanwhile, it is required to consecutively manufacture various kinds of products using a single robot apparatus, and, in manufacturing sites, a step change including exchanging end effectors and tools of the robot apparatus according to a workpiece type and a process flow change is necessary in more and more scenes. Efforts and working time are required for a worker to manually change the configuration of the robot apparatus of this type, and hence there is an increasing demand for a so-called automatic step change in which a step change is performed by programming of the robot apparatus as much as possible.

Under the circumstances, robot apparatuses are required to have a small-size and simple configuration as well as specifications and performance that enable gripping of a wide variety of workpieces and work such as assembling and processing. At the same time, it is desired to: automatically exchange tools for gripping of workpieces and work such as assembling and processing, without the need for work and assistance by a worker; perform an automatic step change by changing the apparatus configuration as little as possible; and enhance the operating rate of the entire robot apparatus.

With regard to the automatic exchange of an operating unit (such as the tools (end effectors) of the robot apparatus and constituent elements of the tools), it is required to reduce the size and weight of each tool, shorten the time to exchange one of the tools and the constituent elements thereof, and enhance the attachment accuracy at the time of the exchange. The tools (end effectors) include a (robot) hand for gripping/transportation, a spray gun for paint application, a welding machine and various other apparatuses, and are exchangeable with respect to a (robot) arm according to a workpiece type and a process flow change. Moreover, in the case of a tool such as a (robot) hand, portions of fingers (which may be referred to as tweezers) for handling a workpiece are exchangeable in some cases. In particular, in order to exchange the portions of the fingers of the hand, such structures as described in Japanese Patent Application Laid-Open No. 2009-125867 and Japanese Patent Application Laid-Open No. 2013-091121 are proposed. For example, in a hand apparatus of an industrial robot described in Japanese Patent Application Laid-Open No. 2009-125867, a nail lock mechanism at a hand leading end is released by an arm movement, whereby old fingers are detached. Then, new fingers are attached by a similar process on the lock mechanism and a similar arm movement. In an exchanging module for a robot hand described in Japanese Patent Application Laid-Open No. 2013-091121, modularized fingers are attached and detached with respect to a hand, whereby the plurality of fingers can be collectively exchanged.

The configuration described in Japanese Patent Application Laid-Open No. 2009-125867 has a problem that: each of finger detachment and finger attachment requires one arm movement; and the finger exchanging motion thus takes time. Japanese Patent Application Laid-Open No. 2009-125867 does not particularly devise how to enhance the positioning accuracy in coupling.

In general, there is a limit on the positioning accuracy of a robot arm, and a positioning error occurs in the operation position of a fingertip. Hence, in the case of attaching a tool by a motion of the robot arm, it is necessary to provide a certain dimensional allowance (clearance) between a tool attaching portion and a tool attached portion. Particularly in the case of repetitively performing an automatic tool exchange, the possibility that mispositioning might occur in a coupling portion within the range of this dimensional allowance remains.

Meanwhile, according to the technique described in Japanese Patent Application Laid-Open No. 2013-091121, when a finger module is first attached to the hand, the attachment is possible by one arm movement. However, in the case of repetitively exchanging different finger modules, Japanese Patent Application Laid-Open No. 2013-091121 has a problem that: a motion of detaching one finger module and then attaching another finger module needs to be performed several times; and the exchanging motion thus takes time. Japanese Patent Application Laid-Open No. 2013-091121 has another problem that: a mechanism for forming finger modules is necessary; the size of the entire hand is increased by attaching a finger module thereto; and the weight of the entire apparatus is larger.

The present invention has an object to enable easily exchanging an operating unit such as tools of a robot apparatus and constituent elements of the tools, without the need for manual work and assistance by a worker, while adopting a simple, inexpensive, small-size and light-weight configuration.

SUMMARY OF THE INVENTION

According to an aspect of the present invention, a robot apparatus comprises a mounting portion that detachably supports a supported portion of an operating unit that operates an operating object, wherein the mounting portion includes: a guiding unit that guides the supported portion so as to enable the supported portion to pass through from one end part of the guiding unit to another end part thereof; and a lock mechanism that moves the supported portion from any of end parts of the guiding unit toward a mount position between the end parts, to thereby bring the supported portion into a restricting state at the mount position, and moves the supported portion toward any of the end parts from the restricting state, to thereby bring the supported portion from the restricting state into a releasing state, in a state where the supported portion is guided by the guiding unit, the robot apparatus moves the supported portion and the guiding unit relative to each other, and controls the supported portion into the restricting state via the lock mechanism, to thereby mount the operating unit on the mounting portion, and, in the state where the supported portion is guided by the guiding unit, the robot apparatus moves the supported portion and the guiding unit relative to each other, and controls the supported portion into the releasing state via the lock mechanism, to thereby remove the operating unit from the mounting portion.

According to the above-mentioned configuration, through a mere movement of the supported portion and the guiding unit relative to each other, the supported portion is controlled into the restricting state via the lock mechanism, whereby the operating unit can be mounted on the mounting portion. Similarly, through a mere movement of the supported portion and the guiding unit relative to each other, the supported portion is controlled into the releasing state via the lock mechanism, whereby the operating unit can be removed from the mounting portion. Consequently, according to the present invention, it is possible to enable easily exchanging the operating unit (such as tools of the robot apparatus and constituent elements of the tools) without the need for manual work and assistance by a worker, while adopting a simple, inexpensive, small-size and light-weight configuration.

Further features of the present invention will become apparent from the following description of exemplary embodiments with reference to the attached drawings.

DESCRIPTION OF THE EMBODIMENTS

Hereinafter, embodiments of the present invention are described with reference to the attached drawings. The following embodiments are given as mere examples, and, for example, detailed configurations can be changed as appropriate by those skilled in the art within the range not departing from the gist of the present invention. Moreover, numerical values taken in the present embodiments are numerical values for reference, and do not limit the present invention.

Embodiment 1

Figure 1:
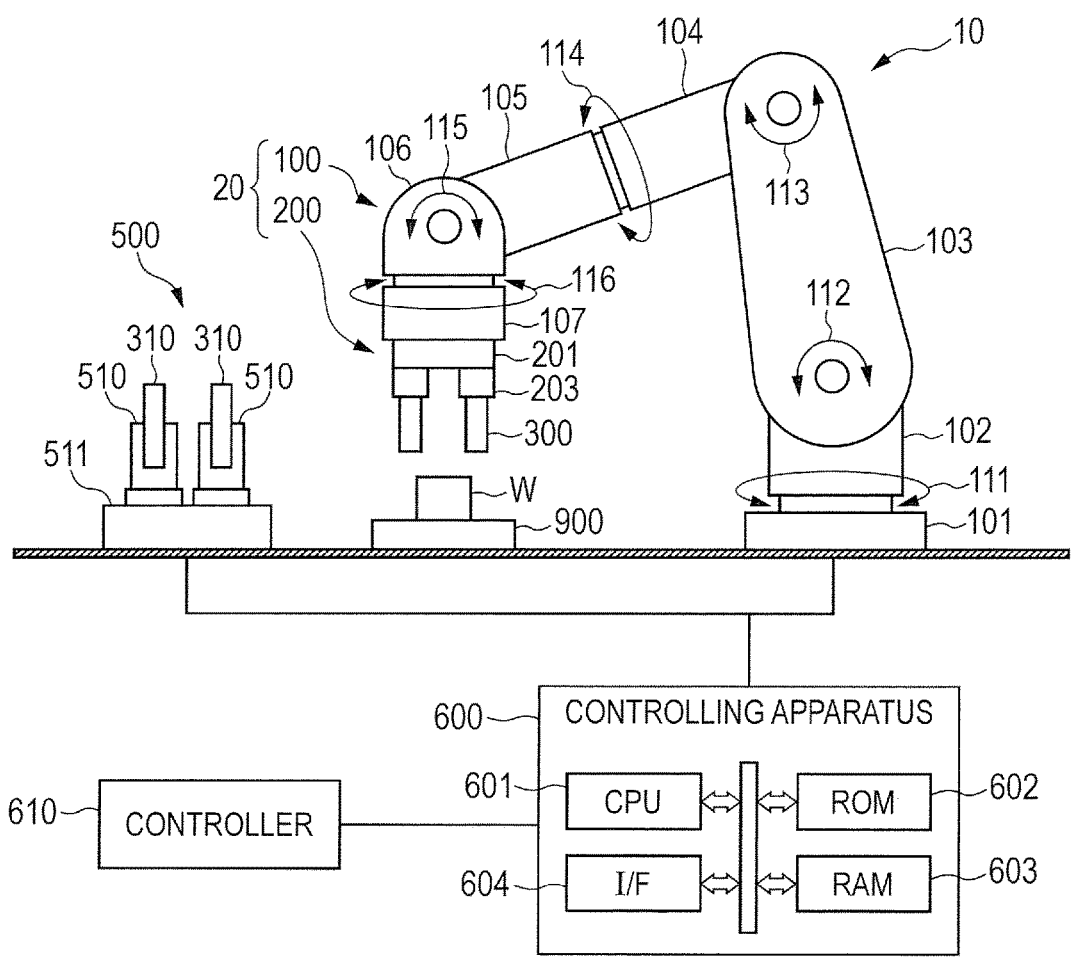
FIG. 1 is an explanatory view illustrating an example schematic configuration of a robot system according to the present invention.
Figure 2:
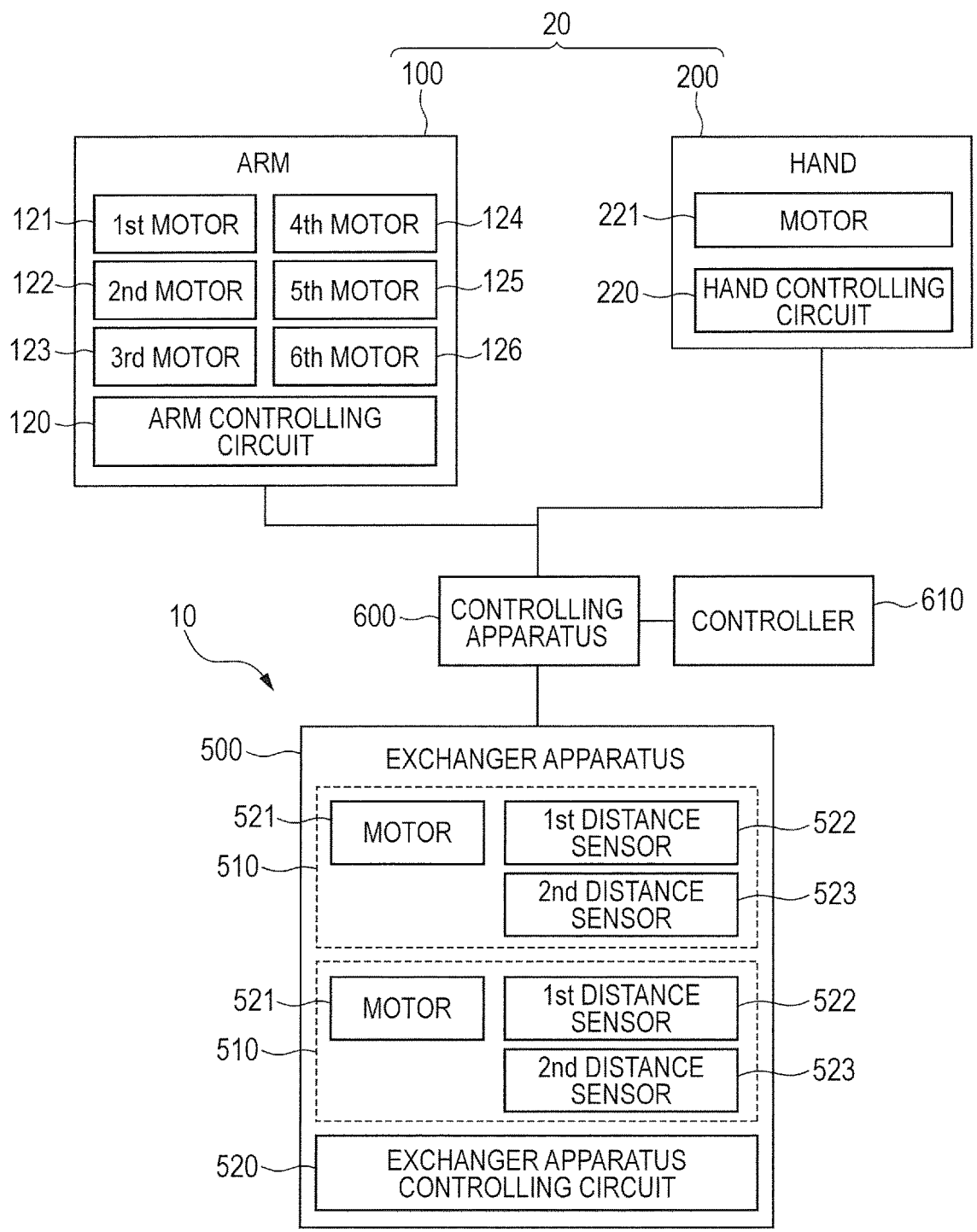
FIG. 2 is a block diagram illustrating a configuration of a control system of the robot system of FIG. 1.

FIG. 1 and FIG. 2 illustrate a configuration example of a robot system capable of carrying out the present invention. In FIG. 1, a robot system 10 includes a robot apparatus 20, an exchanger apparatus 500, and a controlling apparatus 600 and a controller 610 that control the robot apparatus 20 and the exchanger apparatus 500. The controlling apparatus 600 and the controller 610 are illustrated as block diagrams in a lower part of FIG. 1. FIG. 2 illustrates a structure of a control system including the controlling apparatus 600 and the controller 610.

The robot apparatus 20 of FIG. 1 can perform an operation on a workpiece W as an operating object by means of a hand 200 mounted on the leading end of an arm 100.

The hand 200 includes fingers (300 in FIG. 1) that grip the workpiece W, and the hand 200 and/or the fingers 300 are regarded herein as an "operating unit" capable of operating the workpiece W. A configuration and controlling for exchanging such an operating unit are described herein, and an example in which the fingers 300 as the operating unit are attached and detached (exchanged) with respect to the hand 200 is described in Embodiment 1. An example in which an entire end effector (tool) equivalent to the hand 200 is attached and detached (exchanged) as the operating unit with respect to the arm 100 is described later in Embodiment 2.

The robot apparatus 20 includes: a six-axis vertical multi-joint arm (hereinafter, referred to as the arm) 100 including a plurality of joints; and an end effector, for example, the hand 200, and can perform work on the workpiece W placed on a workpiece table 900. Although the six-axis vertical multi-joint arm is given as an example of the arm 100 in the present embodiment, the number of axes and the arm configuration are not limited thereto, and can be changed as appropriate according to use applications and purposes.

The arm 100 includes seven links 101 to 107 and six joints 111 to 116 that swingably or pivotally couple the links 101 to 107. Although fixed-length links are adopted as the links 101 to 107 of the present embodiment, for example, links extendable by linear actuators may be adopted thereas.

An upper left part and an upper right part of FIG. 2 respectively illustrate structures of the arm 100 and the hand 200 in a control system of the robot system 10.

In FIG. 1 and FIG. 2, a joint mechanism for driving the joints 111 to 116 of the arm 100 includes motors 121 to 126 (first to sixth motors) that respectively drive the joints 111 to 116. The motors 121 to 126 are respectively provided with encoders (not illustrated) for detecting the rotation angles (orientations) of the corresponding joints. An arm controlling circuit 120 drives the motors 121 to 126 for the respective joints according to a command from the controlling apparatus 600, while monitoring outputs of the encoders. Consequently, the arm controlling circuit 120 controls the position or orientation (the orientation of each joint) of a particular portion (which is set to, for example, the center of the end face of the link 107 on which the hand 200 is mounted) of the arm 100. The joint mechanism of the arm 100 includes: a driving force transmission mechanism (not illustrated) formed by a timing belt and a pulley; a deceleration mechanism (not illustrated) formed by gears; and a brake mechanism (not illustrated) that supports the position or orientation when current is not applied to the motors 121 to 126.

In FIG. 1, the hand 200 is mounted on the link 107 at the most leading end of the arm 100. In the present embodiment, the hand 200 can be exchanged by, for example, a manual operation by a worker. As described later in Embodiment 2, the hand 200 can also be exchanged without an operation by the worker, using a configuration similar to the configuration of a mechanism for finger exchange to be described in the present embodiment.

At least one degree of freedom in position and orientation of the hand 200 supported by the link 107 can be changed by a motion of the arm 100. The hand 200 includes a hand main body 201 and the exchangeable fingers (300). The fingers (300) are exchangeable with respect to the hand main body 201, and work (operation) on the workpiece W can be performed by combining: controlling of the position or orientation of the arm 100 and the orientation of the hand main body 201; and an opening and closing operation on the fingers (300).

In the state of FIG. 1, the first fingers (operating unit) 300 are mounted on the hand 200. The number of the fingers (300) mountable on the hand 200 of the present embodiment is, for example, two, and the workpiece W can be gripped by opening and closing the two fingers (300).

Figure 6:
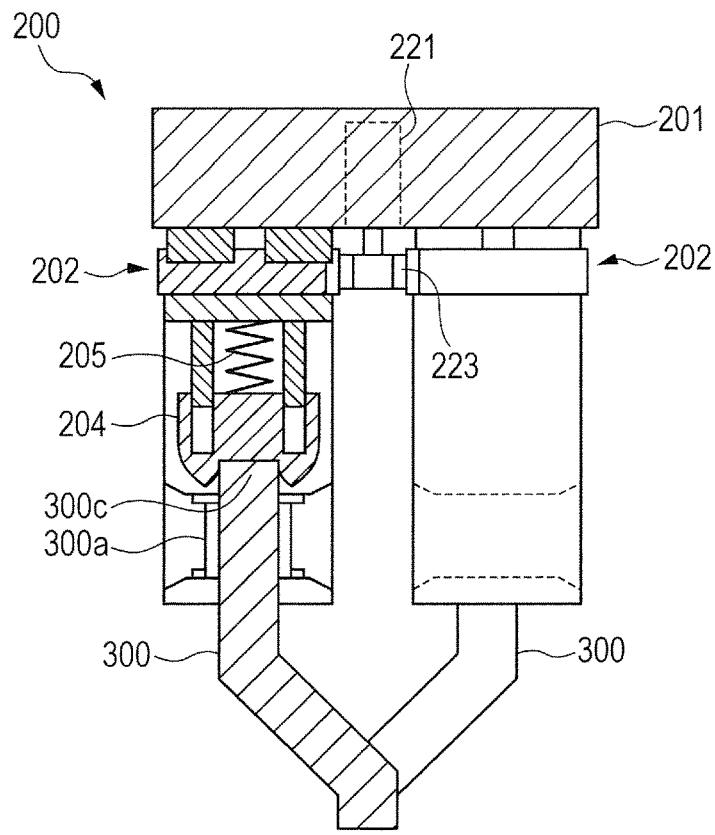
FIG. 6 is a cross-sectional view taken along a line 6-6 in the state where the fingers are attached to the hand of the robot system of FIG. 5.

The two first fingers (working unit) 300 have, for example, shapes left-right symmetric to each other as illustrated in FIG. 6. A drive mechanism for driving the first fingers 300 mounted on the hand main body 201 is formed by a motor 221 (FIG. 2) that drives the first fingers 300. The motor 221 is provided with an encoder (not illustrated) for detecting the rotation angles corresponding to the orientations of the first fingers 300, and a hand controlling circuit 220 (FIG. 2) controls opening and closing of the first fingers 300 according to a command from the controlling apparatus 600, while monitoring an output of the encoder.

In the robot apparatus 20 of FIG. 1, tools other than the hand 200 can be mounted as the end effector. That is, the hand 200 can be exchanged for various other work tools such as a driver, a drill and a welding machine. Accordingly, the robot apparatus 20 can perform work of gripping the workpiece W by means of the hand 200 mounted on the arm 100 and incorporating the workpiece W into another workpiece. Moreover, intended work such as screwing, boring and welding can be performed on the workpiece W by mounting (exchanging for) a tool suitable for the intended work.

In the present embodiment, the fingers (300) are discussed as the operating unit exchangeable with respect to the hand 200. For example, the first fingers 300 are mounted on the hand main body 201 in the state of FIG. 1, and the first fingers 300 can be exchanged for second fingers 310. In the state of FIG. 1, the second fingers 310 are respectively held by tool exchanger units 510 on the left side of FIG. 1.

In the case of changing a product to be assembled (performing a step change), a workpiece W to be gripped and incorporated by the hand 200 is different, and hence fingers can be selectively used according to a workpiece W type and work contents. For example, fingers having different lengths and shapes are prepared as first, second, (third, . . . ) fingers, and the fingers are exchanged according to a workpiece W type and work contents, whereby the fingers best for the workpiece W type and the work contents can be used.

The "operating unit" exchangeable with respect to the hand main body 201 is not limited to the "fingers" for gripping. For example, work tools such as a driver, a drill and a welding machine other than the fingers can be conceived as the operating unit exchangeable with respect to the hand main body 201. If these tools include a mechanism for operating unit exchange to be described later, not only the fingers but also these arbitrary tools can be mounted. The details of the mechanism for operating unit exchange, particularly, a configuration around the hand 200 are described later.

In FIG. 1, the exchanger apparatus 500 (finger/tool exchanger apparatus) includes two tool exchanger units 510. The two tool exchanger units 510 of FIG. 1 respectively hold the second fingers 310 as fingers to be exchanged. Through a transportation motion by a motor and other actuators (not illustrated), the tool exchanger units 510 can mount or remove the two first fingers 300 included in the hand 200 in parallel. A detailed configuration example of the exchanger apparatus 500 is described later.

The controlling apparatus 600 as a controlling unit of the robot system 10 can be formed by a computer including a microprocessor element. The robot apparatus 20 and the exchanger apparatus 500 can be controlled by the controlling apparatus 600.

As illustrated in FIG. 1, the computer forming the controlling apparatus 600 includes, for example, a CPU 601, a ROM 602 that stores programs for controlling constituent elements, a RAM 603, and a communication interface (I/F in FIG. 1) 604. The RAM 603 is used to temporarily store data such as a teaching point and a control command given by operations on the controller 610.

For example, an operating apparatus such as a teaching pendant (TP) can be conceived as the controller 610, and the controller 610 may be another computer apparatus (a PC, a server) capable of editing a robot program. The controller 610 can be connected to the controlling apparatus 600 via a wired or wireless communication connecting unit, and has a user interface function for a robot operation, status displaying and other operations.

The CPU 601 receives, for example, teaching point data input from the controller 610, from the communication interface 604. Moreover, the CPU 601 can generate a track of each axis of the robot apparatus 20, based on the teaching point data input from the controller 610, and can transmit the track of each axis as a target control value to the robot apparatus 20 via the communication interface 604.

Next, in the present embodiment, a configuration example around the hand 200 for attaching and detaching fingers as the operating unit is described. In the present embodiment, two fingers are paired, and a configuration of mounting portions 30 for respectively attaching and detaching (further exchanging) the two paired fingers is described below.

Figure 3:
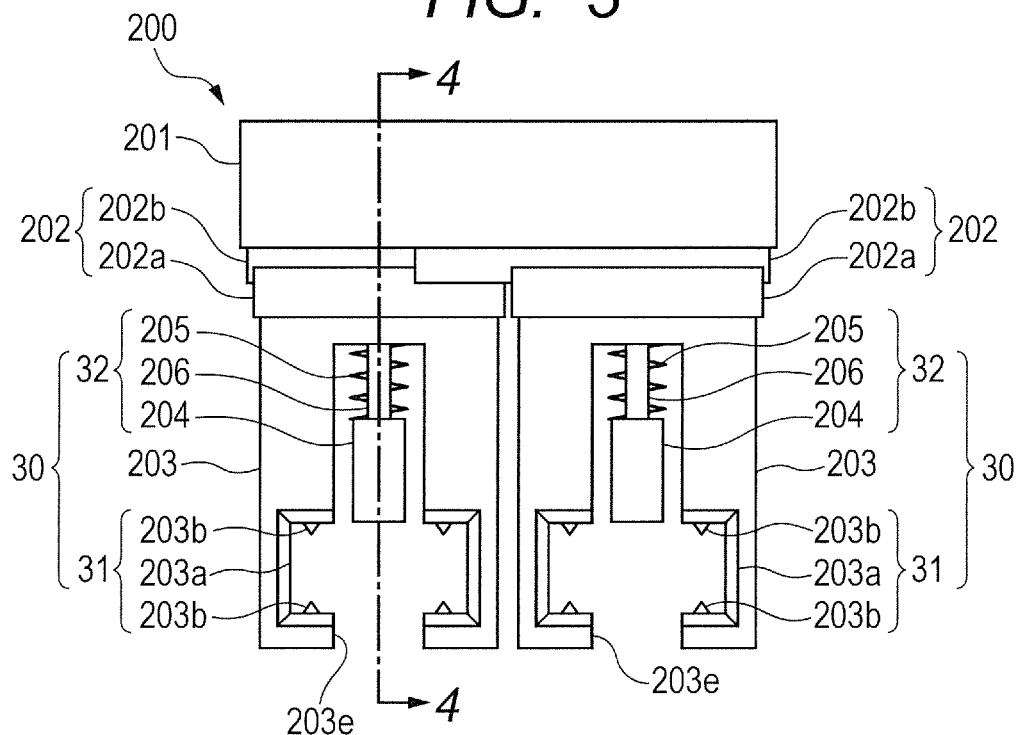
FIG. 3 is a front view of a hand of the robot system of FIG. 1.
Figure 4:
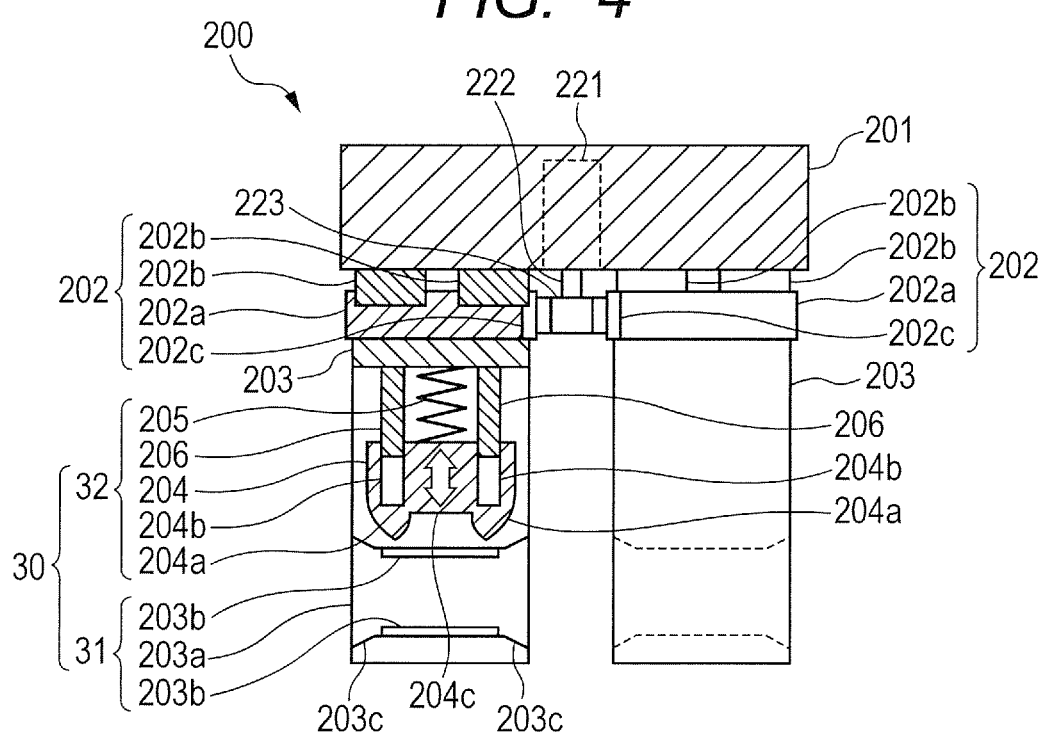
FIG. 4 is a cross-sectional view taken along a line 4-4 in the hand of the robot system of FIG. 3.

As illustrated in FIG. 3 and FIG. 4, the hand main body 201 of the hand 200 is provided with two U-shaped finger bases 203 and 203 via two slide guides 202, respectively. As illustrated in FIG. 3, lower parts of the finger bases 203 and 203 are respectively provided with opening portions 203e and 203e through which upper parts of the fingers can pass during an exchanging motion to be described later.

The motor 221 for finger opening and closing (grip controlling) is arranged inside of the hand main body 201. A pinion gear 223 is provided at the leading end of a pinion shaft 222 corresponding to a drive shaft of the motor 221.

Respective teeth 202c and 202c (racks) on the side surfaces of guide blocks 202a and 202a of the slide guides 202 and 202 can be driven by the pinion gear 223, whereby the guide blocks 202a and 202a can be moved. The two slide guides 202 are arranged point-symmetrically with respect to the rotation axis of the motor 221, and the pinion gear 223 is rotationally driven by the motor 221, whereby the two guide blocks 202a linearly move in opposite directions along respective guide rails 202b.

In this way, the finger bases 203 and 203 can be moved in opposite directions along a direction (the left-right direction in FIG. 3) perpendicular to the sheets of FIG. 4 and FIG. 6 via the guide blocks 202a and 202a, and the fingers 300 and 300 (FIG. 6) can be opened and closed. According to such a drive mechanism, the fingers 300 and 300 (FIG. 6) can be opened and closed, whereby, for example, the workpiece (W) can be gripped, and can be released by cancelling the gripping.

Hereinafter, a detailed configuration of the mounting portions 30 and 30 for respectively mounting the two paired fingers 300 and 300 on the finger bases 203 and 203 is described.

Each slide guide 202 includes the guide rail 202b and the guide block 202a that linearly moves along the guide rail 202b. In each finger base 203, two female dovetails 203a and 203a both the ends of which are opened are formed in shapes symmetric to each other, and convex portions 203b and 203b are respectively formed on two opposed surfaces (two upper and lower surfaces in FIG. 3 and FIG. 4) in the center of each female dovetail 203a.

FIG. 4 is a cross-sectional view taken along a line 4-4 in FIG. 3, and the illustration direction of FIG. 4 (FIG. 6) is different by just 90 degrees from the illustration direction of FIG. 3. As illustrated in FIG. 4, the female dovetail 203a penetrates through the finger base 203, and both the ends thereof are opened.

As illustrated in FIG. 4, inclined portions 203c are respectively formed in the openings at both the ends of the female dovetail 203a. Accordingly, the opening spaces of both the ends of the female dovetail 203a are larger than the cross-sectional space of a portion of the female dovetail 203a in which the convex portions 203b and 203b for finger restriction (positioning) are formed. Such a shape enables easy insertion of male dovetails 300a (to be described later) formed on the finger 300, even if an error in position controlling occurs to some extent.

As illustrated in FIG. 3, FIG. 4 and FIG. 6, a central part of each finger base 203 is provided with a latch 204 that is slidably supported in the top-bottom direction via two guide shafts 206 and 206. The guide shafts 206 are respectively guided inside of spaces 204b provided in the latch 204, whereby the latch 204 linearly moves in the top-bottom direction of FIG. 3, FIG. 4 and FIG. 6. The latch 204 (FIG. 3) is urged downward in FIG. 3 by a coil spring 205. As illustrated in FIG. 4 and FIG. 6, the latch 204 has a cam shape formed by inclined portions 204a and a fixing portion 204c. As illustrated in FIG. 4 and FIG. 6, the inclined portions 204a and 204a of the latch 204 form a cam surface higher than the fixing portion 204c while sandwiching the fixing portion 204c therebetween. As illustrated in FIG. 6, the fixing portion 204c restricts an upper end portion 300c (supported portion) of the finger 300.

In the present embodiment, the female dovetails 203a form a guiding unit 31 for the male dovetails 300a as a mounted portion of the finger 300 (FIG. 3). Moreover, the latch 204, the coil spring 205 and the guide shafts 206 form a lock mechanism 32 that controls the male dovetails 300a as the mounted portion of the finger 300 into one of a restricting state and a releasing state. Each mounting portion 30 that detachably supports the supported portion (male dovetails 300a) of the finger 300 (operating unit) that operates the operating object is roughly formed by the guiding unit 31 and the lock mechanism 32.

Figure 5:
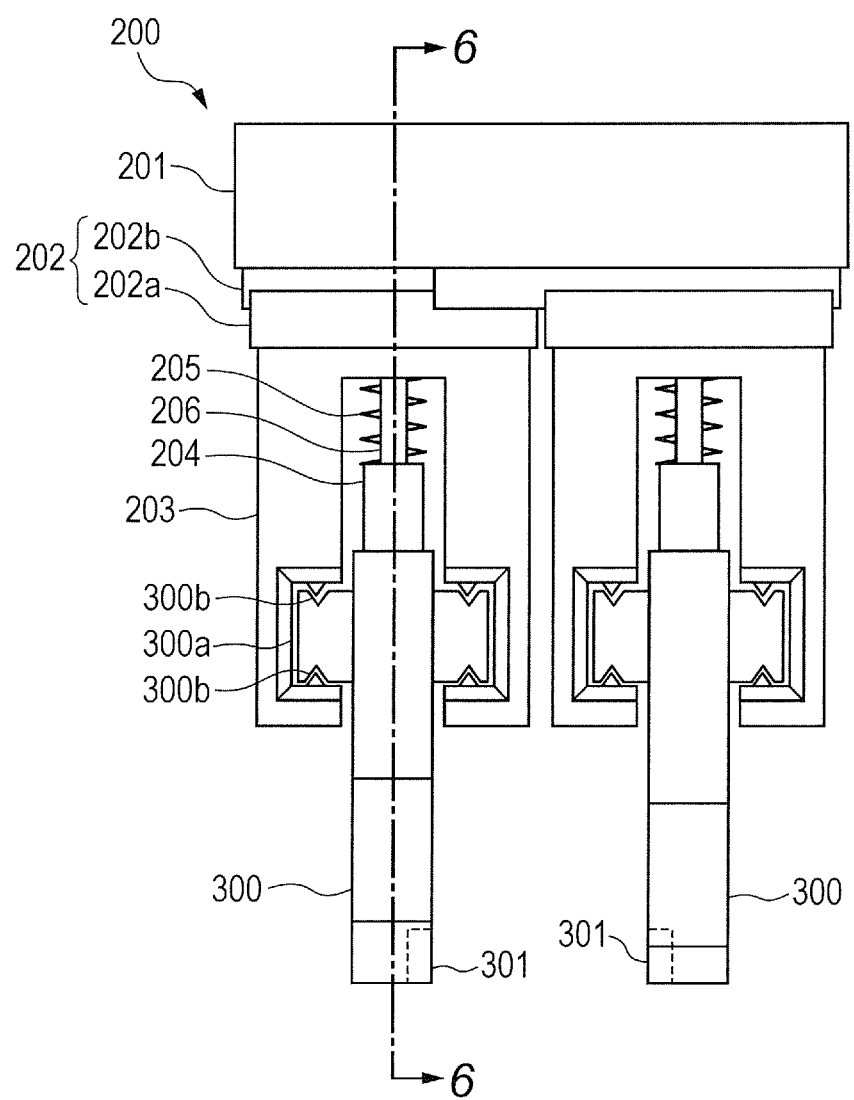
FIG. 5 is a front view of a state where fingers are attached to the hand of the robot system of FIG. 1.

Here, a structure of the first fingers 300 is described with reference to FIG. 5 and FIG. 6. FIG. 5 and FIG. 6 illustrate a state where the first fingers 300 are mounted on the mechanism illustrated in FIG. 3 and FIG. 4. The illustration directions of FIG. 5 and FIG. 6 respectively correspond to the illustration directions of FIG. 3 and FIG. 4.

As illustrated in FIG. 5 and FIG. 6, each first finger 300 of the present embodiment has a shape close to an S-shape. A leading end part of the first finger 300 is provided with a gripping portion 301 for gripping the workpiece W. The two first fingers 300 are closed by driving of the motor 221 so as to approach each other, whereby the two gripping portions 301 approach each other and thus can grip the workpiece W. The two gripping portions 301 are formed using a material suitable for the workpiece (W) to be gripped, such as rubber, metal and resin.

The two male dovetails 300a and 300a are formed left-right symmetrically to each other (in the left-right direction in FIG. 5) in a root part (an end part opposite to the gripping portion 301) of each first finger 300. Moreover, concave portions 300b and 300b are respectively formed on both sides (the upper and lower sides in FIG. 5) of each male dovetail 300a.

In the state where the first fingers 300 are restricted in FIG. 5 and FIG. 6, the latches 204 respectively push the first fingers 300 downward in FIG. 6 due to the elastic force of the coil springs 205 of the mounting portions 30 and 30.

Consequently, the fixing portions 204c respectively fix the root parts of the first fingers 300, and the convex portions 203b and the concave portions 300b on one side are fitted to each other. In this state, the first fingers 300 are restricted (positioned). Meanwhile, dimensional specifications between each female dovetail 203a and each male dovetail 300a are set such that a gap of about 0.1 mm is provided in whole, except for a portion in which the dovetails 203a and 300a are in contact by fitting to each other. Consequently, if the restriction by the latches 204 is canceled, the first fingers 300 can be moved without a significant sliding resistance. Behaviors of the fingers and the mounting portions 30 when the first fingers 300 are exchanged for the second fingers 310 are illustrated in detail in FIG. 12 to FIG. 15 to be described later.

Next, a configuration example of the exchanger apparatus 500 of the present embodiment is described in detail with reference to FIG. 7 to FIG. 9 and FIG. 2.

Figure 7:
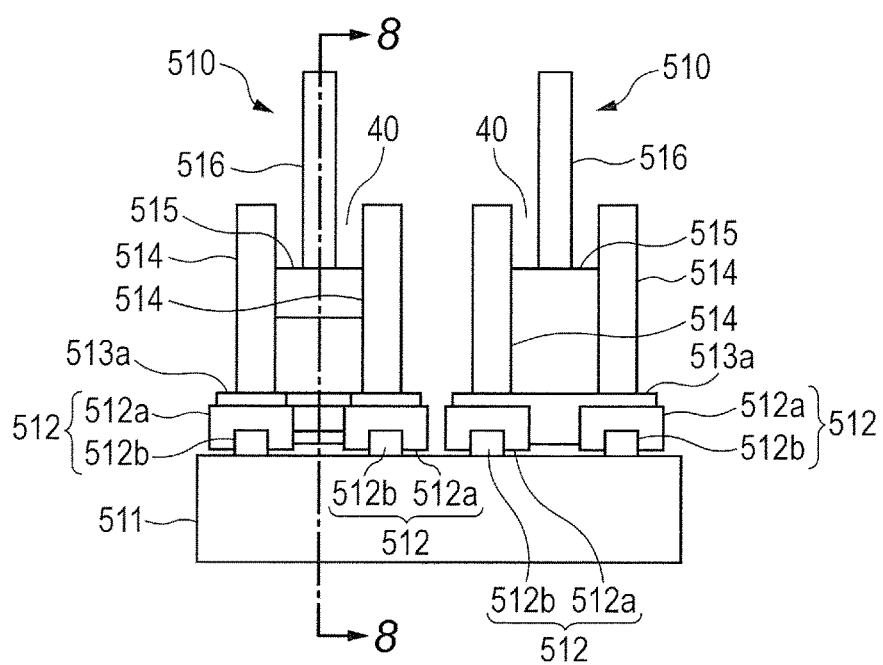
FIG. 7 is a front view illustrating a configuration of a finger exchanger apparatus.
Figure 8:
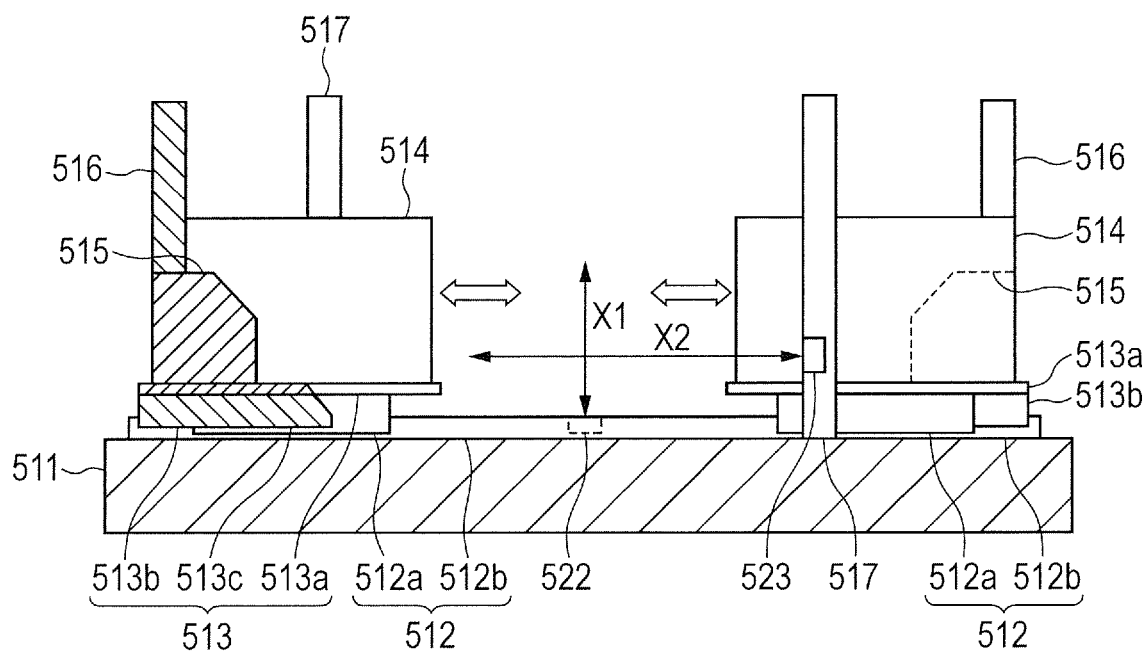
FIG. 8 is a cross-sectional view taken along a line 8-8 in the exchanger apparatus of FIG. 7.
Figure 9:
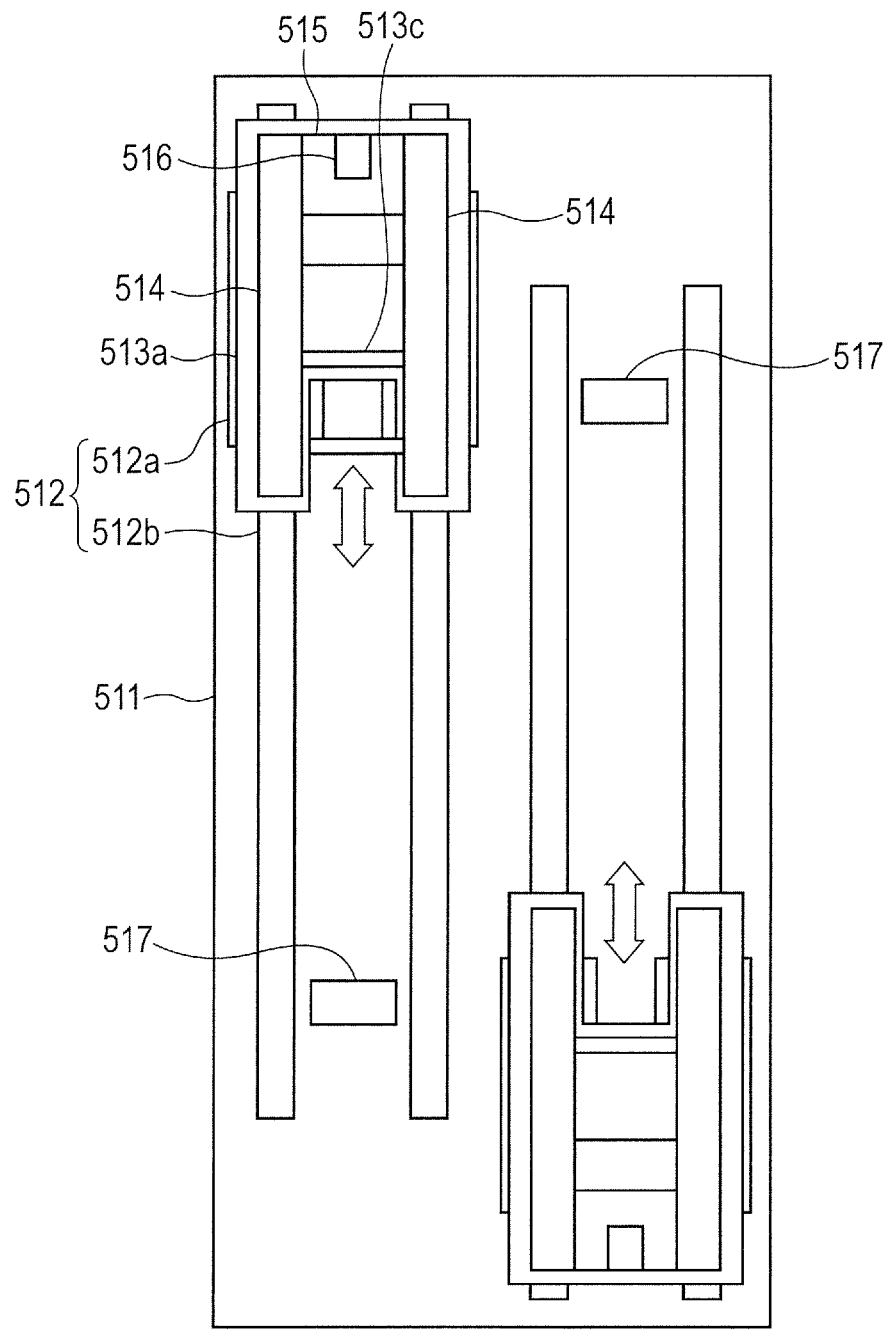
FIG. 9 is a top view of the exchanger apparatus of FIG. 7.

As illustrated in FIG. 7 to FIG. 9, the exchanger apparatus 500 includes an apparatus base 511. The two tool exchanger units 510 and 510 are each arranged on the apparatus base 511 via two slide guides 512. Each tool exchanger unit 510 can hold and transport one second finger 310 (one first finger 300).

The two tool exchanger units 510 and 510 serve to substantially simultaneously exchange two fingers (first fingers 300) mounted on the hand 200 for other fingers (second fingers 310), and are arranged point-symmetrically with respect to the central point of the apparatus base 511. Each slide guide 512 includes a guide block 512a and a guide rail 512b.

A holding unit 513 including a holding plate 513a and a holding pedestal 513b is fixed to the two guide blocks 512a. The entire holding unit 513 is driven by the driving force of a motor 521 (FIG. 2) via a driving force transmission mechanism (not illustrated) formed by gears so as to linearly move in the left-right direction in FIG. 8 in an integrated manner. An inclined portion 513c that is inclined to the linear movement direction of the two slide guides 512 is continuously formed in the holding plate 513a and the holding pedestal 513b, and a role of the inclined portion 513c is described later.

A control system of the exchanger apparatus 500 is as illustrated in FIG. 2, and includes first distance sensors 522 and second distance sensors 523 that respectively detect the positions of the tool exchanger units 510 and 510, in addition to the motors 521 and 521 that respectively drive the holding units 513 and 513 for the tool exchanger units 510 and 510. The control system of the exchanger apparatus 500 further includes an exchanger apparatus controlling circuit 520 that controls constituent elements of the two tool exchanger units 510 and 510.

Arbitrary detection methods can be adopted for the first distance sensors 522 and the second distance sensors 523, all of targets to be directly detected by these sensors are the fingers, and, for example, optical sensors and small-size digital cameras can be adopted therefor. Moreover, in the case where a magnetic material can be embedded in each of the fingers as the targets to be detected, various magnetic sensors can also be adopted for the first distance sensors 522 and the second distance sensors 523.

As illustrated in FIG. 8, the first distance sensors 522 are respectively embedded in the guide rails 512b and 512b. Each first distance sensor 522 detects a distance X1 to the leading end of the first finger 300 to be exchanged when the first finger 300 approaches by a motion of the arm 100. In this way, based on the position information detected by the first distance sensor 522, it can be checked whether the first finger 300 has come to a correct exchange position. The information detected by the first distance sensor 522 can be used to control timing for performing an exchanging motion.

Two holding walls 514, a pedestal 515 and a first supporting plate 516 fixed to each holding unit 513 form a box-like space having two opened sides. The box-like space having two opened sides corresponds to a holding unit 40 having a shape whose width enables the first finger 300 and the second finger 310 to pass therethrough. That is, the holding unit 40 is a holding unit that holds the second finger 310 (second operating unit) different from the first finger 300 (first operating unit) mounted on each mounting portion 30 of the hand 200.

Two second supporting plates 517 and 517 are provided in a standing manner to the apparatus base 511. In the present embodiment, each second supporting plate 517 forms a re-holding unit that retrieves the finger (for example, the first finger 300) as the operating unit removed from each mounting portion 30 of the hand 200 after the exchange of this finger and re-holds the retrieved finger at a holding position of each holding unit 40.

As illustrated in FIG. 8, the second distance sensors 523 are respectively embedded in the second supporting plates 517 and 517. Each second distance sensor 523 detects a distance X2 to the second finger 310 held by each tool exchanger unit 510, and the position (distance) information detected by the second distance sensor 523 can be used to control timing for performing an exchanging motion on the second finger 310. Motions of the second supporting plates 517 are described later with reference to, for example, FIG. 15 to FIG. 18. The holding plate 513a of each holding unit 513 has a shape that is partially opened in a U-shape, and hence the motion range thereof is not limited by contact with each second supporting plate 517, with respect to the motion range of the two slide guides 512.

Next, a motion (automatic step) of respectively exchanging the first fingers 300 (first operating unit) mounted on the mounting portions 30 for the second fingers 310 (second operating unit) different from the first fingers 300 in the above-mentioned configuration is described with reference to FIG. 10 to FIG. 19.

Figure 10:
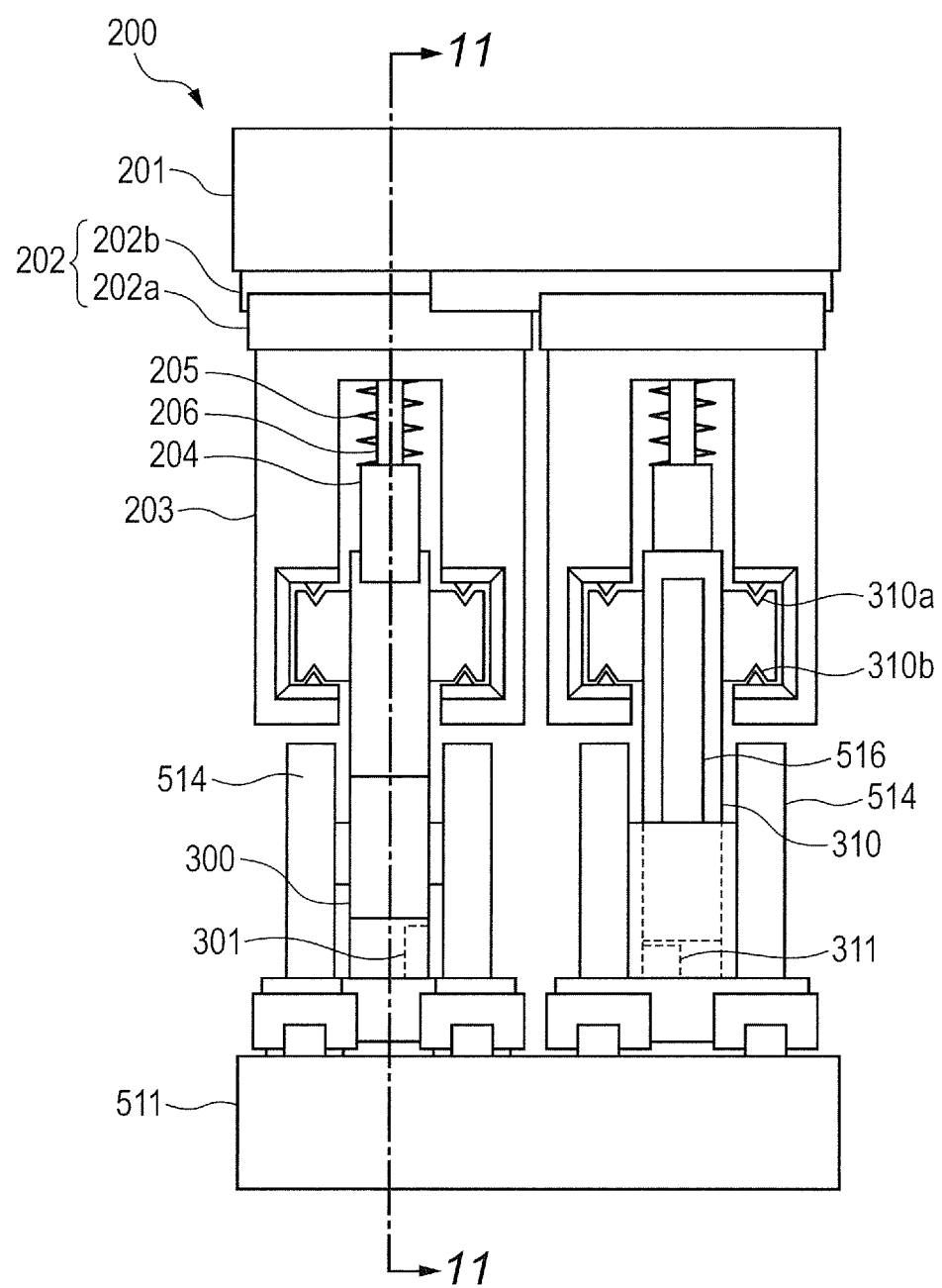
FIG. 10 is a front view of a state before a finger exchanging motion is performed on the hand by the exchanger apparatus of FIG. 7.
Figure 11:
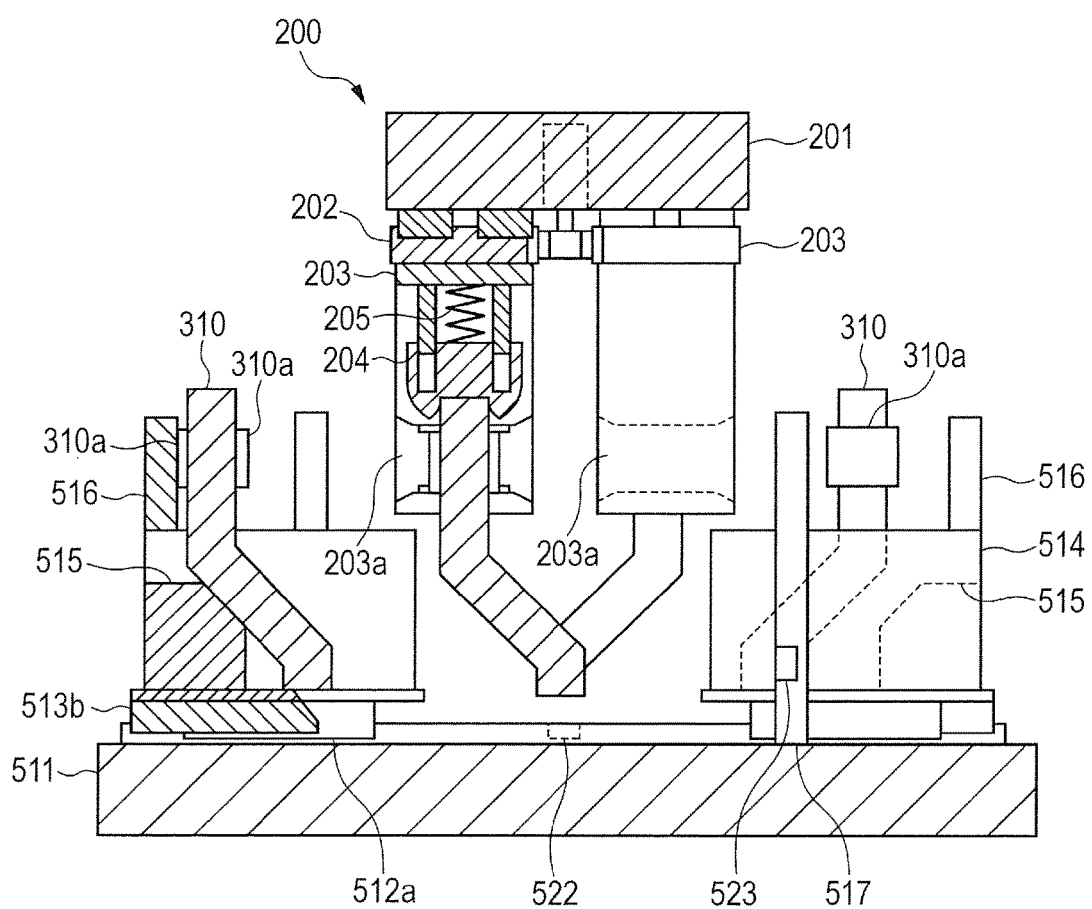
FIG. 11 is a cross-sectional view taken along a line 11-11 in the exchanger apparatus of FIG. 10.

FIG. 10 and FIG. 11 illustrate a state where the two second fingers 310 and 310 are respectively held by the tool exchanger units 510 and 510 of the exchanger apparatus 500. In particular, FIG. 11 illustrates a state after the position of the arm 100 relative to the exchanger apparatus 500 is moved to a position at which the first fingers 300 can be exchanged.

The leading end of each second finger 310 is provided with a gripping portion 311 for gripping a workpiece (not illustrated) having a shape different from the shape of the workpiece W. As illustrated in FIG. 11, the second finger 310 has an S-shape similar to the shape of the first finger 300. In the state where the two second fingers 310 are respectively mounted on the finger bases 203, the two second fingers 310 are closed so as to approach each other, whereby the two gripping portions 311 approach each other and thus can grip the workpiece. Of course, this configuration is similar to the configuration of the first fingers 300.

Two male dovetails 310a are formed left-right symmetrically to each other (in the left-right direction in FIG. 10) in a root part (an end part opposite to the gripping portion 311) of each second finger 310, and the male dovetails 310a have the same shape as the shape of the male dovetails 300a formed in each first finger 300. Moreover, similarly to the male dovetails 300a, concave portions 310b are respectively formed on both sides (the upper and lower sides in FIG. 10) of each male dovetail 310a. That is, the structure of the supported portion of the finger formed by the male dovetails 310a has the same shape and dimensions as the shape and dimensions formed by the male dovetails 300a formed in the first finger 300.

Each second finger 310 is placed on the pedestal 515, the movable direction thereof is limited by the holding walls 514 and the first supporting plate 516, and the second finger 310 can be moved via the tool exchanger unit 510. In the case where the second finger 310 receives force in a direction from the second finger 310 toward the first supporting plate 516, the supporting plate 516 receives the force, and hence the second finger 310 keeps being placed on the pedestal 515. That is, even if force is applied to the second finger 310 from the direction opposite to the supporting plate 516 by moving the tool exchanger unit 510, the second finger 310 can be kept in a held state.

FIG. 11 illustrates a position or orientation to be taken by at least the hand 200 (namely, the finger bases 203) at the leading end of the arm 100 with respect to the tool exchanger units 510 and 510 of the exchanger apparatus 500, in a state immediately before the first fingers 300 are respectively exchanged for the second fingers 310. That is, at the time of a finger exchanging motion, the hand 200 (namely, the finger bases 203) moves to a position between the tool exchanger units 510 and 510. Moreover, the height of the hand 200 (namely, the finger bases 203 and 203) is controlled such that the height of the female dovetails 203a (guiding units 31) of the mounting portions (30) for the fingers is coincident with the height of the male dovetails 310a (supported portions) of the second fingers 310. Needless to say, the orientation of the hand 200 (namely, the finger bases 203) is controlled such that the central axes of the finger bases 203 and 203 (the central axis of the hand 200) are perpendicular to the plane of the apparatus base 511.

Next, a motion of exchanging the operating unit of the hand 200 from the first fingers 300 to the second fingers 310 by the exchanger apparatus 500 is described with reference to FIG. 12 to FIG. 18. At the same time, a time-series controlling flow is described with reference to FIG. 19 that is a flowchart illustrating procedures for this exchanging motion. The procedures illustrated in FIG. 19 can be described as a control program executable by the CPU 601 of the controlling apparatus 600, and can be stored in advance in, for example, the ROM 602.

In the following, for ease of description, illustration of reference signs and statement of part of the constituent members of the hand 200 are omitted, and the description is given mostly focusing on one finger. However, it goes without saying that another finger is also exchanged by a similar motion, because of such a symmetric mechanism as described above.

First, the hand 200 is moved close to the exchanger apparatus 500 by moving each joint of the arm 100 of the robot apparatus 20 (Step S01). At this time, the positions of the hand 200 and the first finger 300 attached to the hand 200 are detected by the first distance sensor 522, and it is checked whether the hand 200 and the first finger 300 have come to a correct exchange position (Step S02). FIG. 11 illustrates the position relation between the hand 200 and the exchanger apparatus 500 at this time.

Figure 12:
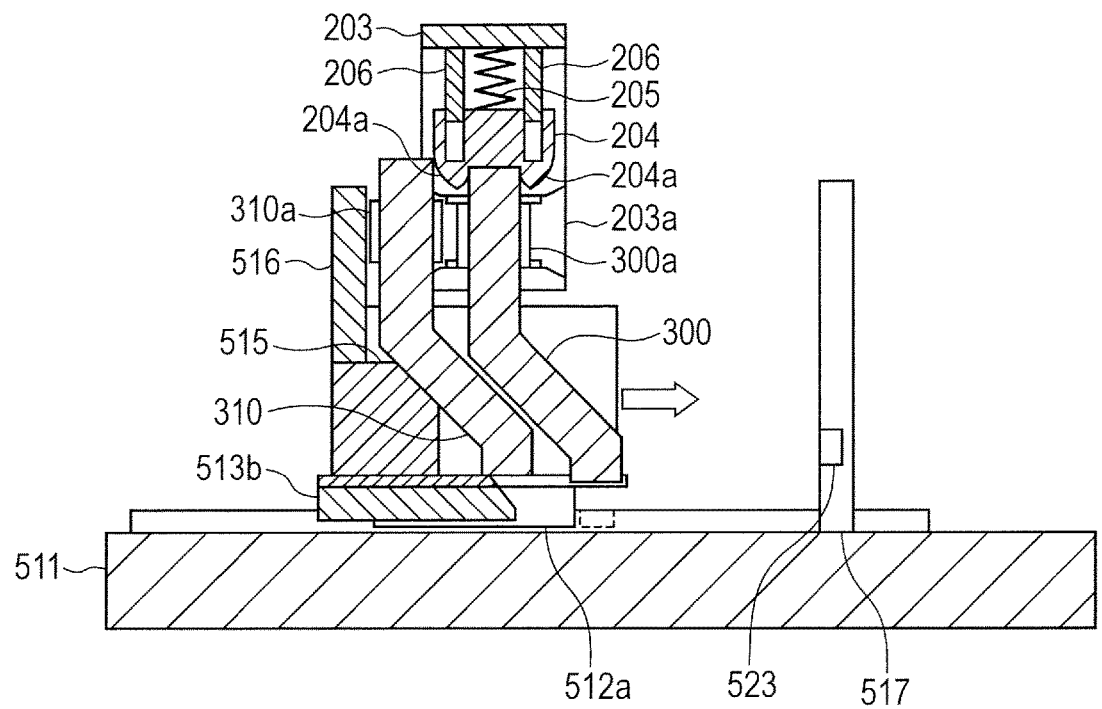
FIG. 12 relates to the finger exchanging motion by the exchanger apparatus of FIG. 7 to FIG. 10, and is a cross-sectional view taken along a line 11-11 in FIG. 10, illustrating a structure around a set of fingers in a state where a second finger is in contact with a latch.

Subsequently, as illustrated in FIG. 12, the tool exchanger unit 510 holding the second finger 310 is moved by driving the motor 521 of the exchanger apparatus 500, and the second finger 310 is moved close to the first finger 300 (Step S10). At this time, the motor 521 of the exchanger apparatus 500 can be controlled using the position information on the second finger 310 detected by the second distance sensor 523.

FIG. 12 to FIG. 18 each illustrate a motion concerning the tool exchanger unit 510 on one side of the exchanger apparatus 500 as described above. A motion of the tool exchanger unit 510 on another side thereof is left-right symmetric to the illustration in FIG. 12 to FIG. 18. If the right and left of the illustration in FIG. 12 to FIG. 18 are reversed, a motion around the tool exchanger unit 510 on the another side can be understood.

The second finger 310 is moved by the tool exchanger unit 510 from the left side of FIG. 12, and is moved close to the first finger 300. At this time, first, the root part (the leading end opposite to the gripping portion 311) of the second finger 310 enters the opening portion 203e (FIG. 3) below the female dovetails 203a (guiding unit 31), and a leading end part of the root part thereof touches the inclined portion 204a of the latch 204 (Step S11). At this time, the male dovetails 300a of the first finger 300 and the male dovetails 310a of the second finger 310 are still in a non-contact state. The first supporting plate 516 is formed so as to have dimensions smaller than the space in the central part of the finger base 203 (FIG. 9), and thus can pass through the space of the opening portion 203e.

Figure 13:
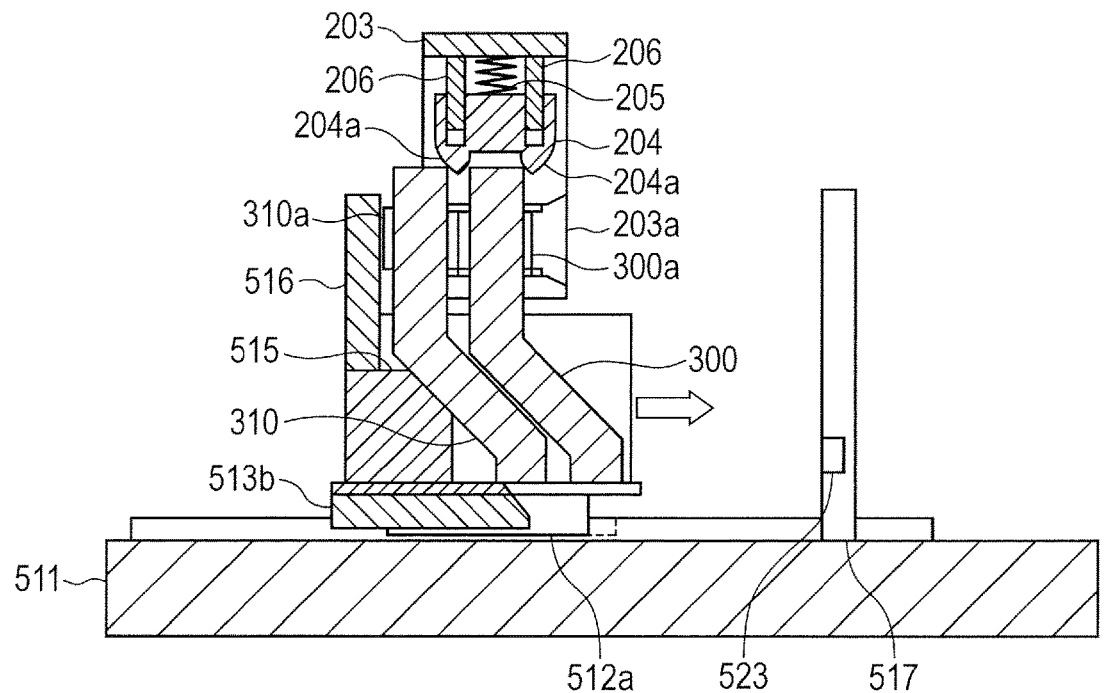
FIG. 13 relates to the finger exchanging motion by the exchanger apparatus of FIG. 7 to FIG. 10, and is a cross-sectional view taken along the line 11-11 in FIG. 10, illustrating the structure around the set of fingers in a state where the second finger is in contact with a first finger.

If the second finger 310 is moved closer to the first finger 300 by further moving the tool exchanger unit 510, the leading end of the second finger 310 runs on a left-end part of the cam surface of the latch 204, and pushes the left-end part upward in FIG. 12. Consequently, as illustrated in FIG. 12 and FIG. 13, the coil spring 205 is compressed, and the latch 204 is pushed up along the guide shafts 206. This brings the first finger 300 into a releasing state, and makes the first finger 300 movable along the female dovetails 203a of the finger base 203 (Step S12). Then, the male dovetails 300a of the first finger 300 respectively touch the male dovetails 310a of the second finger 310, whereby the first finger 300 pushed by the second finger 310 moves rightward in FIG. 13.

Figure 14:
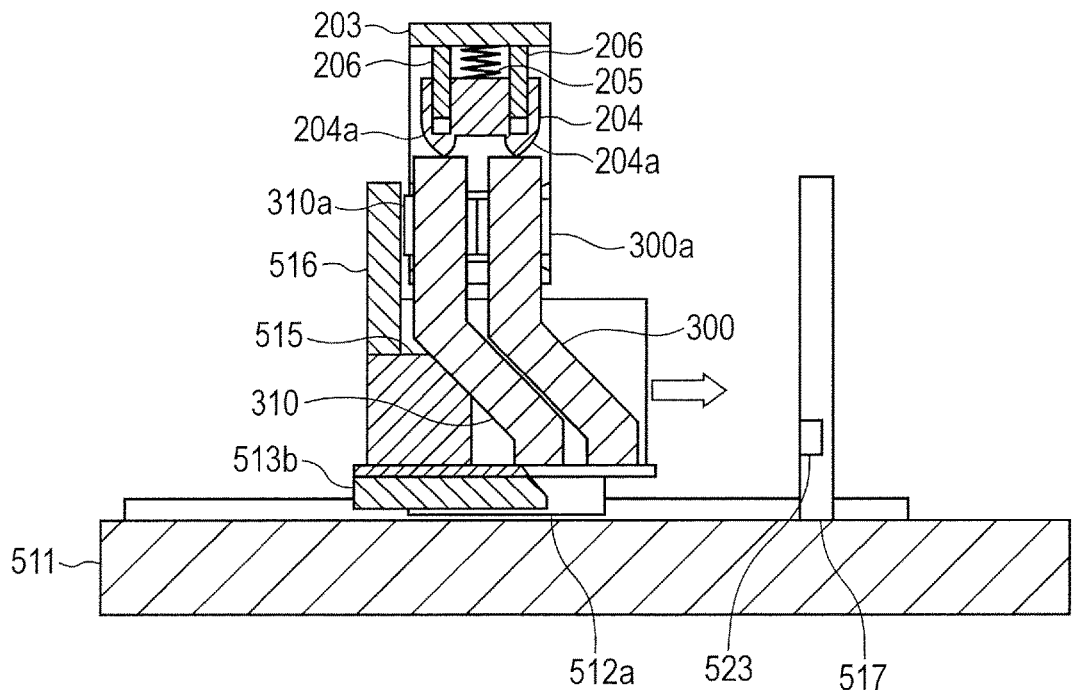
FIG. 14 relates to the finger exchanging motion by the exchanger apparatus of FIG. 7 to FIG. 10, and is a cross-sectional view taken along the line 11-11 in FIG. 10, illustrating the structure around the set of fingers in a state where the first finger is released from restriction by the latch.
Figure 15:
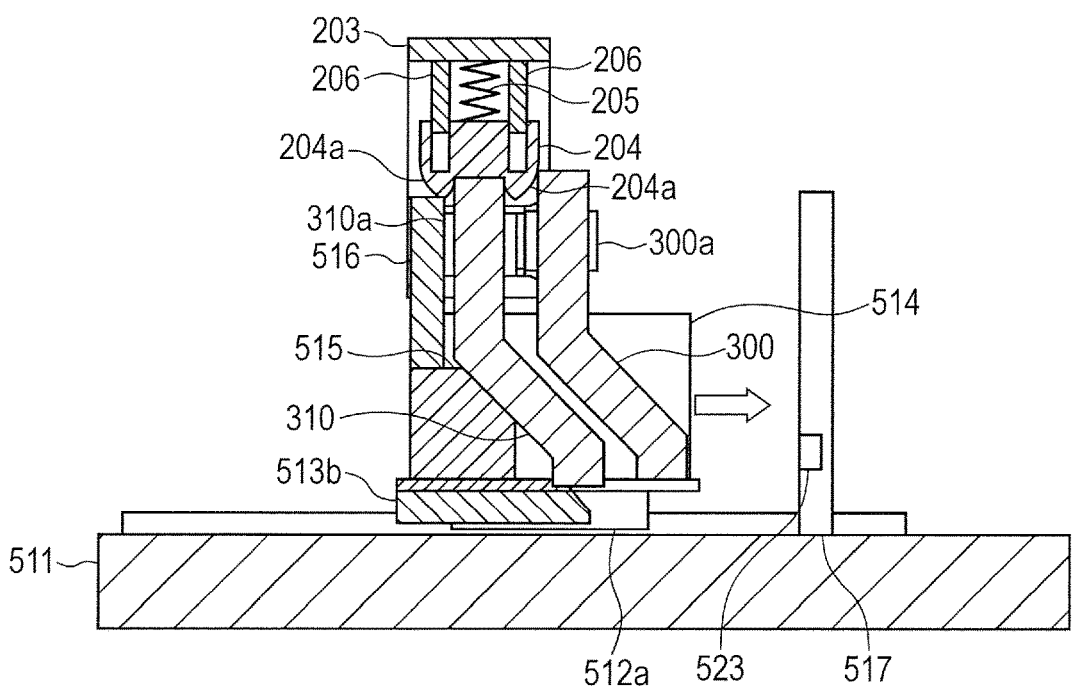
FIG. 15 relates to the finger exchanging motion by the exchanger apparatus of FIG. 7 to FIG. 10, and is a cross-sectional view taken along the line 11-11 in FIG. 10, illustrating the structure around the set of fingers in a state where the second finger is fixed by the latch.

If the second finger 310 is moved further closer to the first finger 300, the finger exchanging motion makes such transition as illustrated in FIG. 14 and FIG. 15 (Step S13). That is, as illustrated in FIG. 14 and FIG. 15, the first finger 300 is pushed out of the latch 204 of the finger base 203 to be brought into a releasing state. At this time, because the inner periphery of the fixing portion 204c of the latch 204 is inclined, the first finger 300 is pushed out and removed without being caught. In such a manner as described above, the first finger 300 is pushed out and ejected from the guiding unit (31). In this state, another finger can be fixed to the fixing portion 204c of the latch 204.

Then, as illustrated in FIG. 15, if the end part of the second finger 310 comes to a position at which the end part thereof engages with the fixing portion 204c, the pushed-up coil spring 205 extends to push down the latch 204, and this brings the second finger 310 into a restricting state at a mount position (Step S14). At this time, similarly to the case of the first finger 300, the latch 204 pushes the second finger 310 downward in FIG. 15 due to the elastic force of the coil spring 205.

Consequently, the convex portions 203b and the concave portions 310b are fitted to each other, and the second finger 310 is controlled into a restricting (positioning) state.

In this way, through a linear relative movement between the exchanger apparatus 500 and the hand 200 (arm 100) with at most one degree of freedom, the first finger 300 can be controlled into a releasing state, or the second finger 310 can be controlled into a restricting state. That is, through this motion, the first finger 300 can be exchanged for the second finger 310.

The CPU 601 can detect whether or not the second finger 310 is in a restricting state at the mount position, based on, for example, a change in detection signal from the second distance sensor 523. If it is determined that the second finger 310 is in a restricting state at the mount position, that is, that the second finger 310 is correctly mounted (Step S20), the CPU 601 stops the tool exchanger unit 510 (Step S21).

Figure 16:
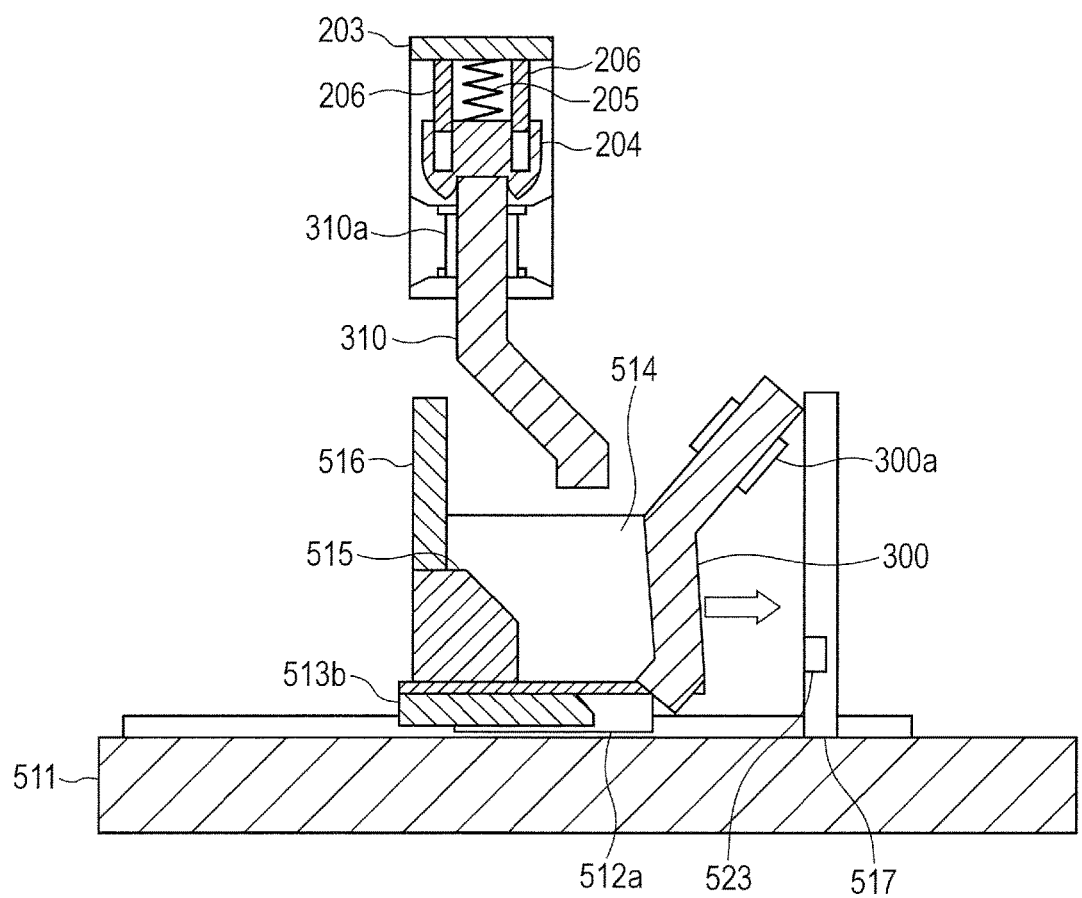
FIG. 16 relates to the finger exchanging motion by the exchanger apparatus of FIG. 7 to FIG. 10, and is a cross-sectional view taken along the line 11-11 in FIG. 10, illustrating a structure of the hand on which the second finger is mounted and a structure of the first finger supported by a second supporting plate.

After that, the hand 200 is retracted, for example, upward as illustrated in FIG. 16 by moving each joint of the arm 100, whereby the hand 200 is moved away from the tool exchanger unit 510 (Step S30). During this motion, as illustrated in FIG. 16, the first finger 300, which is not held, gradually falls toward the second supporting plate 517 while being kicked out by a bent part of the second finger 310, and is finally stopped by being supported by the second supporting plate 517. At this time, the falling direction of the first finger 300 is limited by the holding walls 514 and 514 that guide the first finger 300 from both the sides (see FIG. 10).

Figure 17:
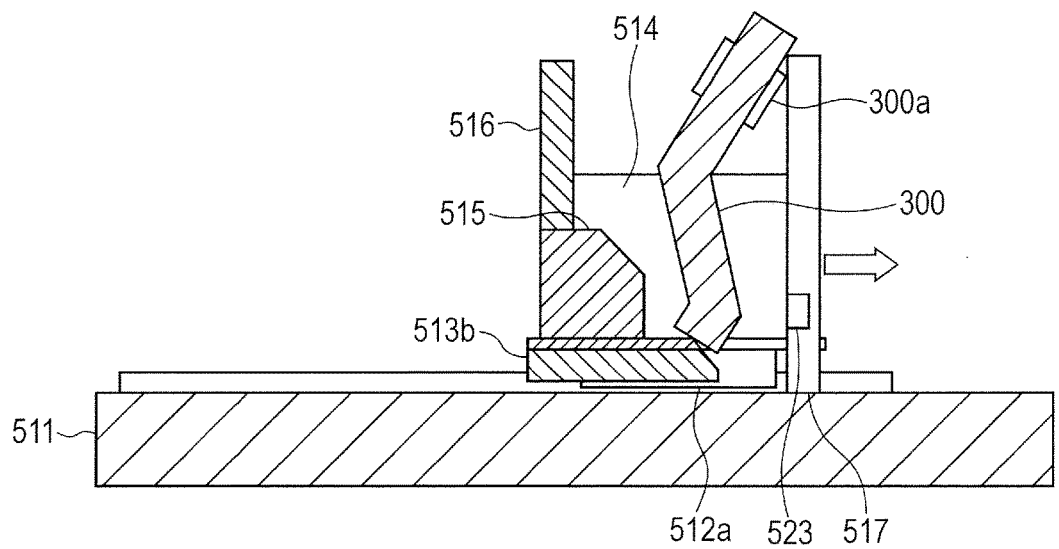
FIG. 17 relates to a first finger retrieving motion by the exchanger apparatus of FIG. 7 to FIG. 10, and is a cross-sectional view taken along the line 11-11 in FIG. 10, illustrating the structure around the set of fingers in a state where the first finger runs on a holding unit.

If the tool exchanger unit 510 is moved further rightward, as illustrated in FIG. 17, the inclination of the first finger 300 is gradually returned within the space between the holding walls 514 and 514, from the state where the first finger 300 is supported by the second supporting plate 517 (Step S31). If this motion is continued, the first finger 300 is gradually moved close to the first supporting plate 516 of the tool exchanger unit 510. Then, as illustrated in FIG. 18, if the first finger 300 abuts against the inclined portion 513c provided to the holding unit 513, the first finger 300 is returned to the orientation of a holding position by the inclined portion 513c.

Figure 18:
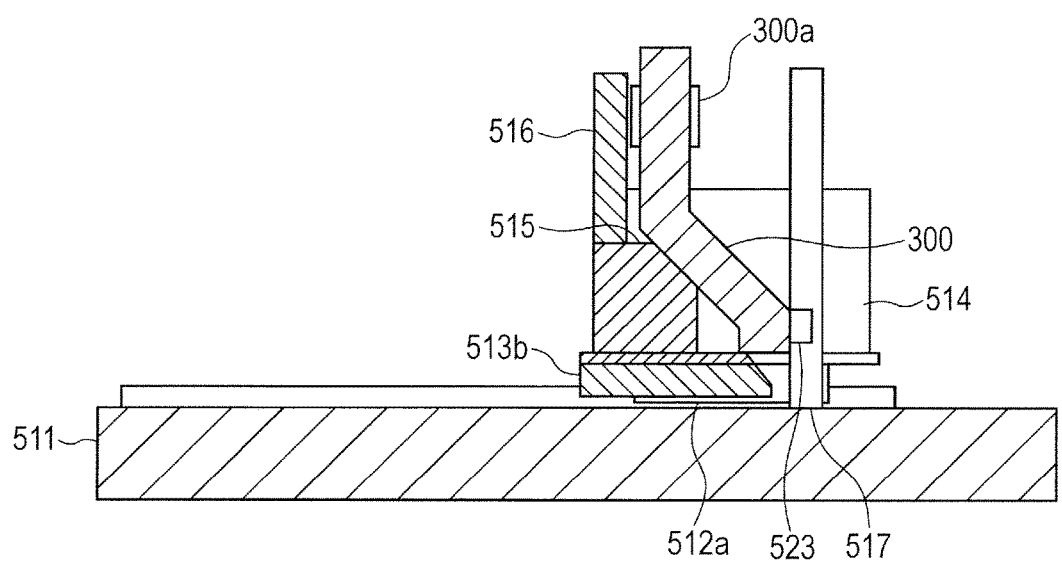
FIG. 18 relates to the first finger retrieving motion by the exchanger apparatus of FIG. 7 to FIG. 10, and is a cross-sectional view taken along the line 11-11 in FIG. 10, illustrating the structure around the set of fingers in a state where the first finger is held by a tool exchanger unit.
Figure 19:
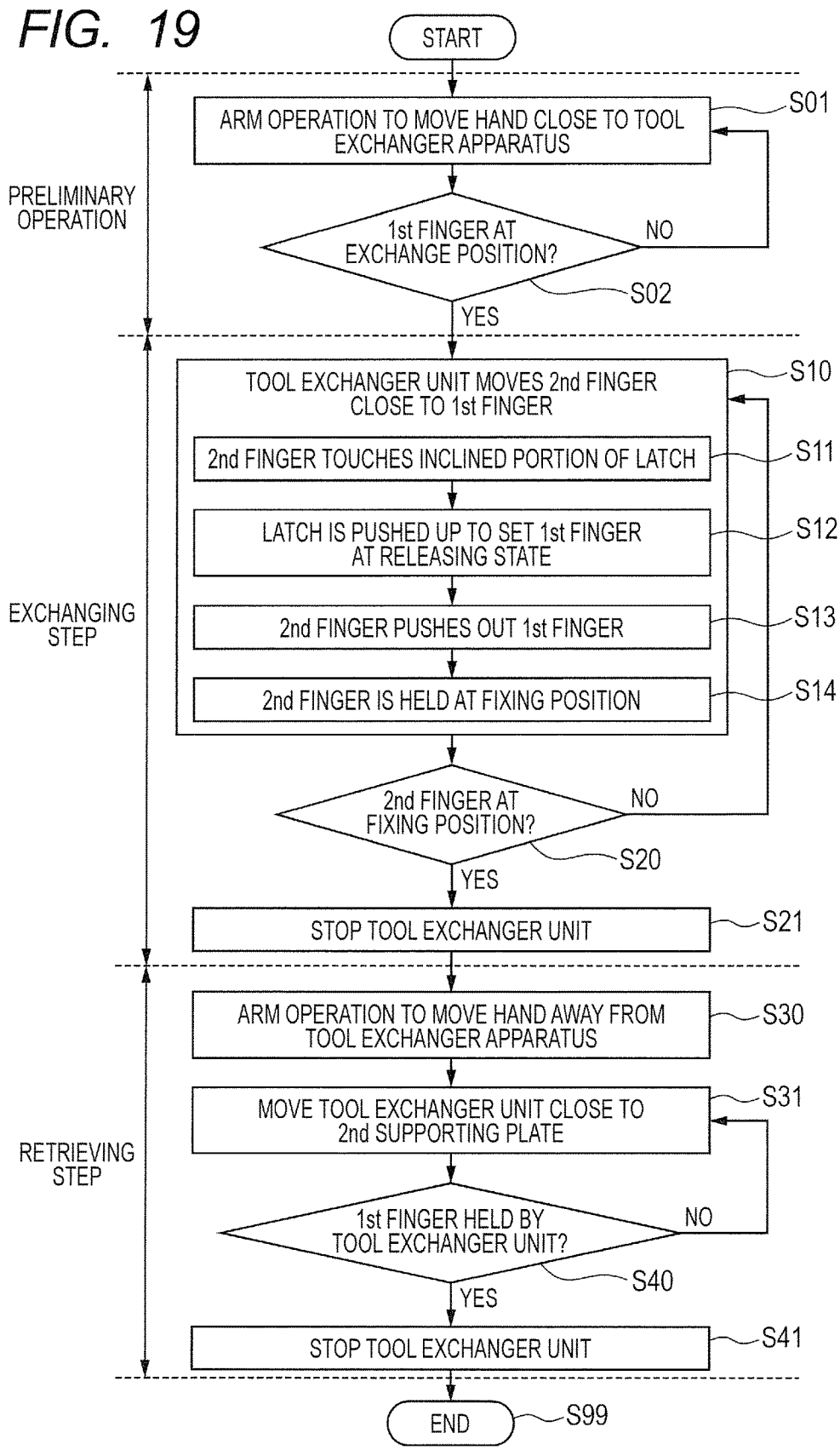
FIG. 19 is a flowchart illustrating procedures for finger exchange controlling according to the present invention.

A state where the tool exchanger unit 510 is at the position in FIG. 18 and where the first finger 300 is held by the tool exchanger unit 510 is detected by the second distance sensor 523 (Step S40). Upon detection of this state, the CPU 601 stops the tool exchanger unit 510 (Step S41), and the finger exchange procedures are ended (Step S99).

The tool exchanger unit 510 is returned to the initial position (an end part opposite to the second supporting plate 517) thereof, whereby exchanging for the first finger 300 again is possible. Through controlling and a motion similar to the above, the first finger 300 can be attached to the hand 200 again. In such a manner as described above, different operating units (fingers) can be repetitively exchanged and used.

As illustrated in FIG. 1, the two (or more) tool exchanger units 510 are prepared, whereby a corresponding number of (different) fingers can be prepared for exchange. In this case, if a finger as the operating unit is exchanged one after another through the above-mentioned exchange controlling, the tool exchanger unit 510 holding a particular finger may change one after another. To deal with this, the tool exchanger units 510, 510, . . . and the types of fingers that are respectively held by the tool exchanger units 510, 510, . . . in an initial state may be recorded in a table memory prepared in, for example, the RAM 603. Then, according to the progress of a finger exchange, the CPU 601 updates data of the table memory based on the holding position of an exchanged particular finger. Through such management, an appropriate finger can be mounted as the operating unit according to a workpiece type and the progress of a process.

Conventional exchanger apparatuses require a plurality of motions for detaching an operating unit attached to the arm (hand) and for attaching a different operating unit thereto, as a motion for exchanging a tool (fingers) as an operating unit. Hence, conventional configurations have a problem that the exchanging motion takes time. In particular, in the case of moving a vertical multi-joint arm, there is no choice but to limit the movement speed, considering contact with external environment and prevention of a collision with the exchanger apparatus, and hence the time required for the exchanging motion tends to increase.

In comparison, according to the present embodiment, each finger base 203 is provided with the guiding unit 31 including the female dovetails 203a that guide the supported portion (male dovetails 300a or 310a) of the finger so as to enable the supported portion to pass through the guiding unit 31. Each finger base 203 is further provided with the lock mechanism 32 that controls the supported portion (male dovetails 300a or 310a) of the finger into one of a restricting state and a releasing state at the mount position inside of the guiding unit 31 by means of the latch operating on the cam surface when the supported portion passes through the guiding unit 31.

According to the above-mentioned structure, through a linear relative movement between the exchanger apparatus 500 and the hand 200 (arm 100) with at most one degree of freedom, detachment and attachment of fingers as the operating unit, that is, a finger exchange can be performed by a series of motions. Consequently, the time required for an automatic step including a finger exchange can be considerably shortened. In addition, according to the present embodiment, the convex portions 203b of the female dovetails 203a of each finger base 203 are respectively engaged with the concave portions (300b or 310b) of the male dovetails (300a or 310a) of each first or second finger (300 or 310), whereby finger positioning is performed. Hence, a finger exchange with high positioning accuracy can be repetitively performed, and a workpiece can be handled with high accuracy by the fingers (operating unit).

Although the work of exchanging two fingers is described in the present embodiment, the number of arranged fingers is not limited as long as restriction conditions such as the number of tools (fingers) attached to the arm (hand) and the apparatus installation space are satisfied. Moreover, tool types, finger types and other conditions can be variously changed and modified within the range not departing from the scope of the present invention, and the present invention is not limited to particular configurations described in the above-mentioned embodiment.

Embodiment 2

In the above-mentioned embodiment, the fingers are given as an example of the operating unit to be exchanged. The above-mentioned structure of each mounting portion 30 can also be applied to an end effector exchange, the mounting portion 30 including: the guiding unit 31 that guides the supported portion (male dovetails 310a) of the operating unit (finger); and the lock mechanism 32 that controls the operating unit (finger) into one of a restricting state and a releasing state. In this regard, the same applies to the exchanger apparatus.

In the present embodiment, a configuration for exchanging an end effector (tool) corresponding to the hand 200 is described as an example. In the present embodiment, a configuration for easily performing a tool exchanging motion by setting the arm 100 to a particular orientation when the tool exchanging motion is performed is also described. In the present embodiment, members that are the same as or correspond to the members in Embodiment 1 are denoted by the same reference signs, and detailed description thereof is omitted. Moreover, in a robot system of the present embodiment, even configurations not illustrated in the present embodiment (including the configuration of a control system) are assumed to be similar to the configurations in Embodiment 1.

Figure 20:
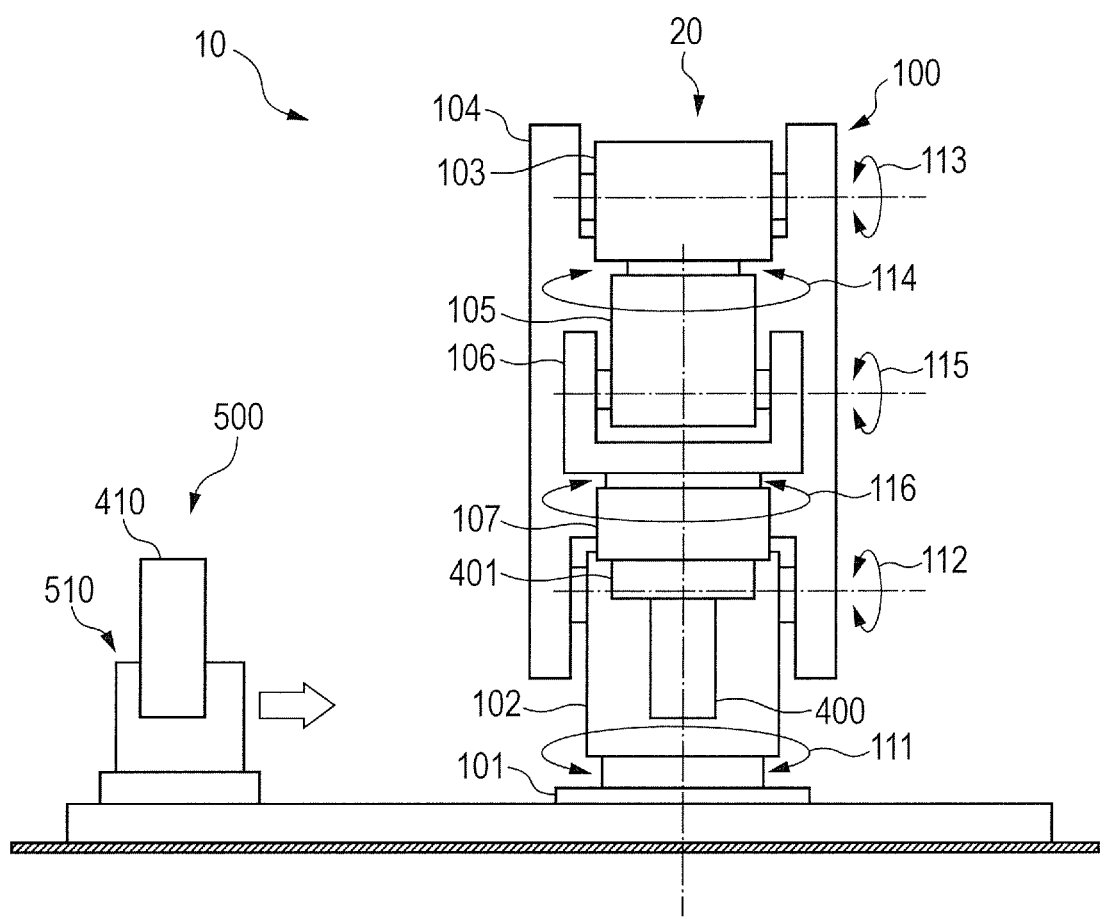
FIG. 20 is an explanatory view illustrating a schematic configuration of a tool exchanging motion by the exchanger apparatus according to the present invention.

FIG. 20 illustrates a portion of the robot apparatus 20 and the exchanger apparatus 500 (including the tool exchanger unit 510) of the robot system 10. In FIG. 20, the robot apparatus 20 is illustrated from a direction corresponding to the left side of FIG. 1. The present embodiment is the same as Embodiment 1 in that the arm 100 of the robot apparatus 20 includes the seven links 101 to 107 and the six joints 111 to 116 that swingably or pivotally couple the links 101 to 107.

In the present embodiment, a first work tool 400 corresponding to the end effector (tool), that is, the hand 200 of Embodiment 1 is attached to the arm 100. The first work tool 400 can be exchanged for a second work tool 410 held by the tool exchanger unit 510 of the exchanger apparatus 500, using the exchanger apparatus 500. That is, in the present embodiment, the first work tool 400 as the end effector (tool) can be exchanged.

Figure 21:
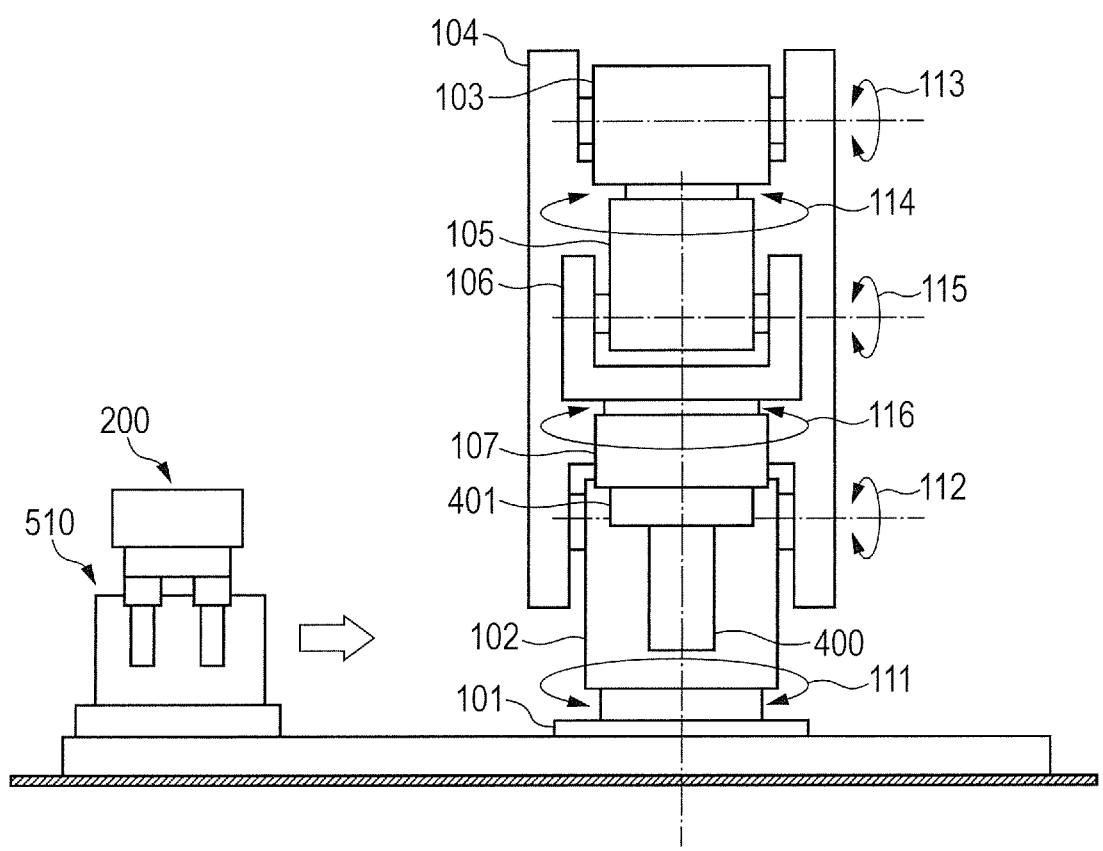
FIG. 21 is an explanatory view illustrating a schematic configuration of a hand exchanging motion by the exchanger apparatus according to the present invention.

The first work tool 400 and the second work tool 410, which are schematically illustrated in FIG. 20, are, for example, a spray gun for paint application, a nozzle for welding, and an electric screwdriver, and an arbitrary configuration can be adopted therefor according to use applications. Note that, as illustrated in FIG. 21, the tool exchanger unit 510 may hold the hand 200, to exchange the hand 200 held for the first work tool 400, according to a motion similar to that in the case of the second work tool 410.

In FIG. 20, the second work tool 410 is held by the tool exchanger unit 510 of the exchanger apparatus 500. The tool exchanger unit 510, which is schematically illustrated in FIG. 20, is assumed to be configured similarly to Embodiment 1.

The first work tool 400 is attached to the link 107 at the most leading end of the arm 100 via a tool base 401 having a U-shape similarly to the finger bases 203 illustrated in FIG. 3.

The tool base 401 corresponds to the finger bases 203 of Embodiment 1. The tool base 401 has a configuration similar to the configuration of the finger bases 203 illustrated in FIG. 3. That is, the tool base 401 is similarly provided with the female dovetails (203a), the convex portions (203b), the coil spring (205), the guide shafts (206) and the latch (204) (all of which are not illustrated). That is, the tool base 401 is provided with the structure of the mounting portion (30) including the guiding unit (31) and the lock mechanism (32) that controls the operating unit (tool) into one of a restricting state and a releasing state.

The structures of supported portions of the first work tool 400 and the second work tool 410 are also similar to the structure of Embodiment 1. That is, similarly to the first fingers 300 illustrated in FIG. 6, upper parts of these tools are each provided with the male dovetails (300a) and the concave portions (300b) (not illustrated). One of the first work tool 400 and the second work tool 410 is mounted via the mounting portion (30) of the tool base 401 such that the central axis of the tool is coincident with the rotation axis of the joint 116 that pivotally supports the link 107.

In the tool exchanger unit 510 of the exchanger apparatus 500, the shape of the holding unit (513) for holding the second work tool 410 (first work tool 400) is changed, but constituent elements and motions are assumed to be similar to the constituent elements and motions of Embodiment 1.

According to such a configuration as described above, also in the present embodiment, the tool exchanger unit 510 is moved relative to the arm 100 (as indicated by an arrow), whereby the first work tool 400 can be removed and the second work tool 410 can be mounted on the mounting portion (30) of the tool base 401. That is, also in the present embodiment, through a linear relative movement between the exchanger apparatus 500 and the hand 200 (arm 100) with one degree of freedom, detachment and attachment of a tool as the operating unit, that is, a tool exchange can be performed by a series of motions.

FIG. 20 illustrates: a moving direction of the tool exchanger unit 510 at the time of performing a tool exchange; and an orientation taken by the arm 100 at this time. That is, as illustrated in FIG. 20, the arm 100 takes such an orientation that the rotation axis of the joint 115 is parallel to the driving direction of the tool exchanger unit 510 and that the rotation axis of the joint 116 is orthogonal to the driving direction of the tool exchanger unit 510.

The guiding direction of the guiding unit (31) of the tool base 401 is the left-right direction in FIG. 20 (similarly to Embodiment 1), and the tool exchanger unit 510 is moved in this direction (as indicated by the arrow), whereby a movement relative to the arm 100 for a tool exchange is performed.

If such a tool exchanging motion as described in Embodiment 1 is performed at such a position or orientation of the arm 100 as illustrated in FIG. 20, the arm 100 receives reaction force from the tool exchanger unit 510 via the work tool 400 and the tool base 401. The rotation axis of the joint 115 is parallel to the direction of the reaction force from the tool exchanger unit 510, and the rotation axis of the joint 116 is orthogonal thereto. Hence, the orientations of the constituent elements of the arm 100 are not changed by influences of the reaction force.

Specifically, (each) joint of the arm 100 is controlled to be one of parallel and orthogonal to the guiding direction of the guiding unit (31) of the tool base 401, that is, the reaction force at the time of an exchanging motion by the tool exchanger unit 510 is applied in a direction different from a direction in which (each) joint is pivoted. That is, according to the present embodiment, in one of the case of mounting a tool (operating unit) on the mounting portion (30) and the case of removing a tool (operating unit) from the mounting portion (30), the position or orientation of the arm 100 is controlled such that the guiding direction of the guiding unit (31) is different from the direction in which each joint of the arm 100 is pivoted.

Consequently, the orientations of the constituent elements of the arm 100 are not changed by the reaction force at the time of an exchanging motion by the tool exchanger unit 510. Accordingly, the mounting portion 30 of the tool base 401 can function without an error, and the tool exchange can be smoothly performed.

In general, in the case of a vertical multi-joint arm, a joint closer to the fingertip has lower moment stiffness. Hence, even in the state where each joint remains stationary, if the joint receives force in the rotating direction thereof, the fingertip position may change due to elastic deformation caused by distortion and a backlash of a drive mechanism. In this case, it is difficult to perform a tool exchange with high accuracy.

To solve this, if (each) joint of the arm 100 is caused to take such an orientation as illustrated in FIG. 20 with respect to the relative movement direction of the tool exchanger unit 510 at the time of a tool exchange, the fingertip position of the arm is not changed by the reaction force at the time of the tool exchange. Such controlling of the position or orientation of the arm 100 enables tool exchanging work with high accuracy. Although the tool attaching direction is one of parallel and orthogonal to the rotation axis of the joint at the fingertip of the arm in the present embodiment, it is sufficient to perform such controlling that the joint at the fingertip of the arm takes an orientation at which the joint rotates less easily, and the present invention is not limited to particular configurations described in the above-mentioned embodiment.

Embodiment 3

In the present embodiment, an alternative example of configuration in which part of the guiding unit 31 of each mounting portion 30 is changed is mainly described. In the following, members that have already been described above are denoted by the same reference signs in the drawings referred to below, and detailed description thereof is omitted. The description in the above-mentioned embodiments directly is applied to these members, unless particularly mentioned.

For example, in Embodiment 1, the guiding unit 31 includes the female dovetails 203a of each finger base 203, whereas the supported portion of each operating unit (300, 310, 400 and 410) includes the male dovetails 310a. The female dovetails 203a of the guiding unit 31 guide the supported portion (male dovetails 310a) such that the supported portion passes through from one end part of the female dovetails 203a to another end part thereof.

The structure for fitting the female dovetails 203a to the male dovetails 310a has, itself, a function of guiding the supported portion (male dovetails 310a) such that the supported portion can be guided along a predetermined track (guiding track) from one end part of the female dovetails 203a of the guiding unit 31 to another end part thereof.

Further, in the above-mentioned embodiments, the concave-convex structure of the convex portions 203b and the concave portions 310b is provided between the female dovetails 203a and the male dovetails 310a, particularly before and after a predetermined mount position (the fixing portion 204c of the latch 204). According to such a structure, the track, that is, the guiding track along which the male dovetails 310a respectively move relative to the female dovetails 203a can be controlled with higher accuracy, particularly before and after the predetermined mount position (the fixing portion 204c of the latch 204).

In Embodiment 1, as illustrated in FIG. 3, a total of four convex portions 203b are provided on the upper and lower sides of the female dovetails 203a on the right and left sides of each finger base 203. Similarly, a total of four concave portions 300b to be respectively engaged with the convex portions 203b are provided in the male dovetails 300a of each first finger 300 (the male dovetails 310a of each second finger 310).

However, in the above-mentioned embodiments, the concave-convex structure (310b and 203b described below) defining the guiding track for the supported portion (male dovetails 310a) does not necessarily need to be provided between the guiding unit (31: the female dovetails 203a) and the supported portion (male dovetails 310a). For example, depending on controlling of the processing accuracy of the fitting structure of the female dovetails 203a and the male dovetails 310a, the guiding track may be controllable with sufficiently high accuracy by only the fitting structure itself of the dovetails 203a and 310a.

The concave-convex structure (310b and 203b described above) defining the guiding track for the supported portion (male dovetails 310a) guided by the guiding unit 31 may not necessarily need to have as strict a configuration as that in the above-mentioned embodiments. Accordingly, a simplified configuration of the concave-convex structure (310b and 203b described above) defining the guiding track for the supported portion (male dovetails 310a) is described below as an example.

If the configuration of the guiding unit 31 has at least one portion in which a pair of the convex portion 203b and the concave portion 300b engage with each other, a backlash in a given direction can be suppressed, and a function as the guiding unit 31 can be fulfilled. Then, if the numbers of the convex portions 203b and the concave portions 300b are minimized, the component processing accuracy can be alleviated, and the guiding mechanism can be formed at low costs.

Figure 22:
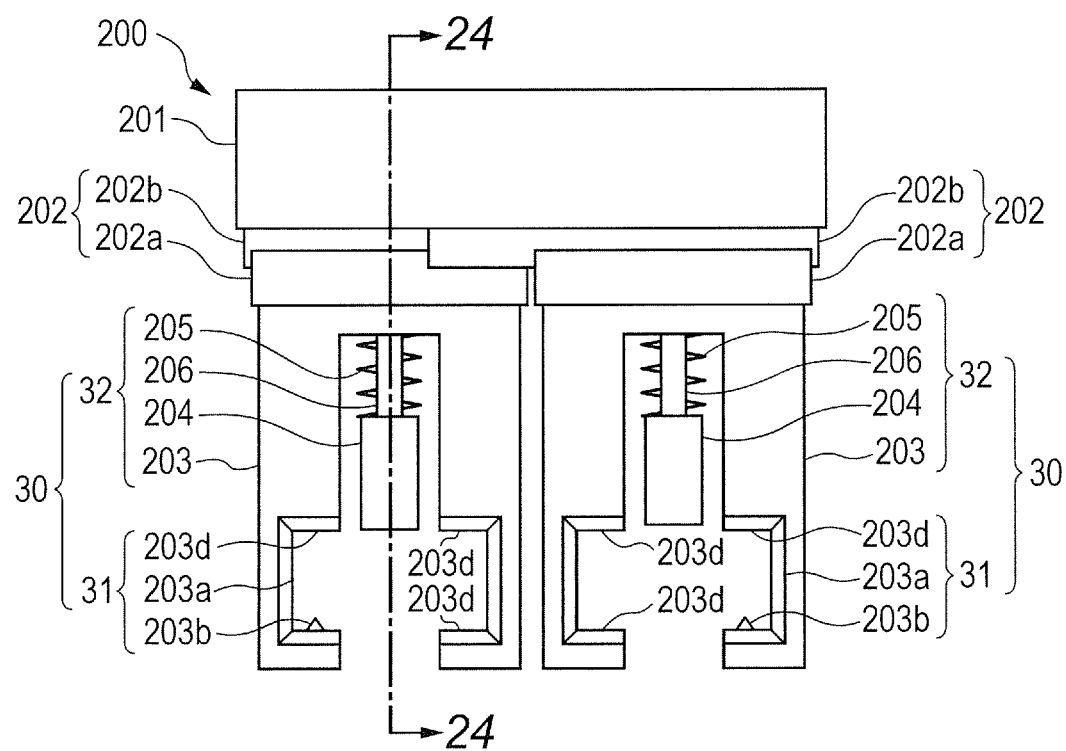
FIG. 22 is a front view illustrating an alternative configuration of the finger exchanger apparatus.
Figure 23:
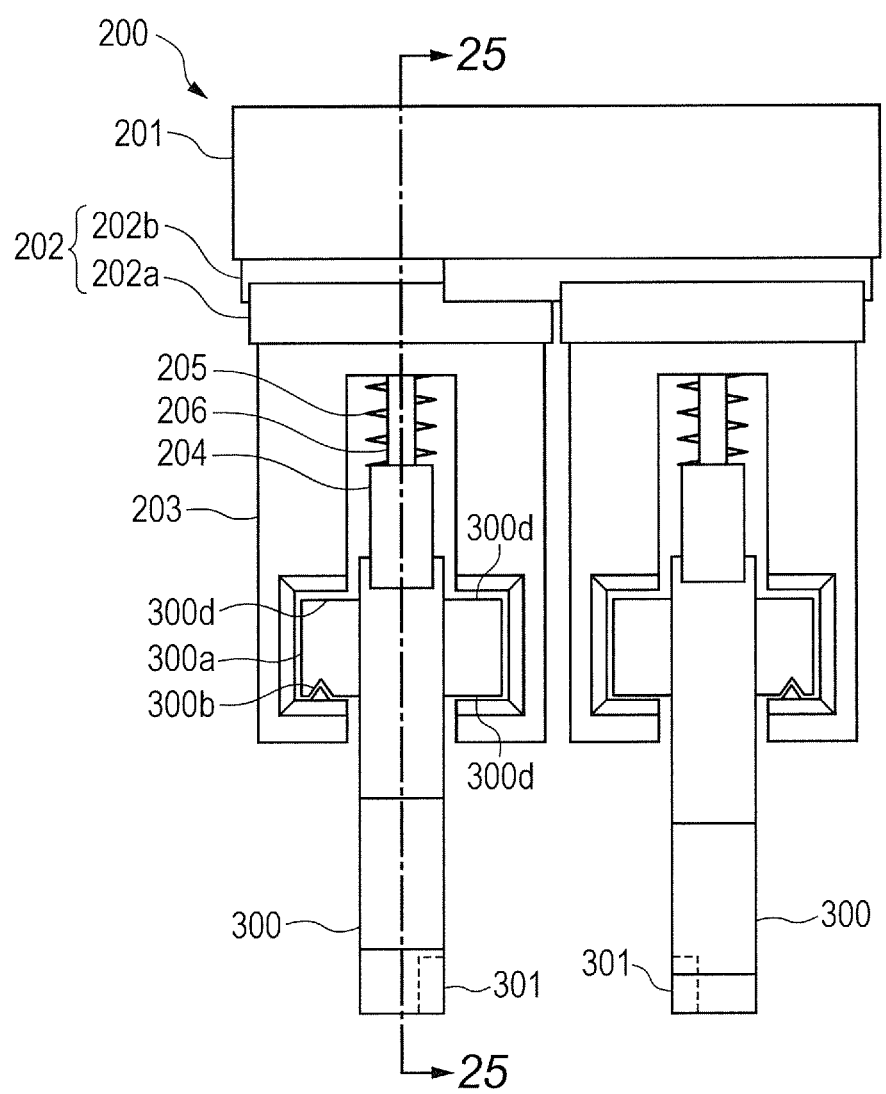
FIG. 23 is a front view of a state where fingers are attached to the hand of the robot system of FIG. 22.

FIG. 22 illustrates the configuration of the guiding unit 31 having only one portion in which a pair of the convex portion 203b and the concave portion 300b engage with each other. FIG. 23 is a front view of a state where fingers are attached to the hand of the robot system of FIG. 22. That is, only one convex portion 203b is provided in one of the two female dovetails 203a of each finger base 203, and planar portions 203d are provided in the other portions thereof. Similarly, only one concave portion 300b is provided in one of the two male dovetails 300a of each first finger 300, and planar portions 300d are formed in the other portions thereof. According to such a configuration, costs for component processing can be reduced without impairing the function as the guiding unit 31. In the case where a load on each finger is limited to a given direction, such a configuration is effective.

When each finger is fixed, the male dovetails 300a are respectively pushed against the female dovetails 203a by the lock mechanism 32. Hence, if a pair of the concave portion 300b and the convex portion 203b are formed at a position illustrated in (on the lower side of) FIG. 22 and FIG. 23, an effect of suppressing a backlash is obtained, and this is an advantageous configuration. The number and arrangement of pairs of the concave portion 300b and the convex portion 203b are not limited to this configuration as long as the function as the guiding unit 31 for guiding the finger can be fulfilled.

It is described in Embodiment 1 that, as illustrated in FIG. 4 and FIG. 6, each first finger 300 is fixed by fitting between the fixing portion 204c of the latch 204 and the upper portion 300c of the first finger 300. This configuration serves for positioning of the finger by the latch 204 in the moving direction (the left-right direction in FIG. 6) at the time of a finger exchange.

In the case where the fitting part between the fixing portion 204c of the latch 204 and the upper portion 300c of the first finger 300 has a linear shape, if a gap in the fitting part is excessively small, the fixing portion 204c and the upper portion 300c may be caught by each other during the fitting therebetween and may not be fitted to each other to the end. Hence, it is necessary to provide a gap of about 0.1 mm to the fitting part, but, if the gap exists, finger mispositioning may occur.

Figure 24:
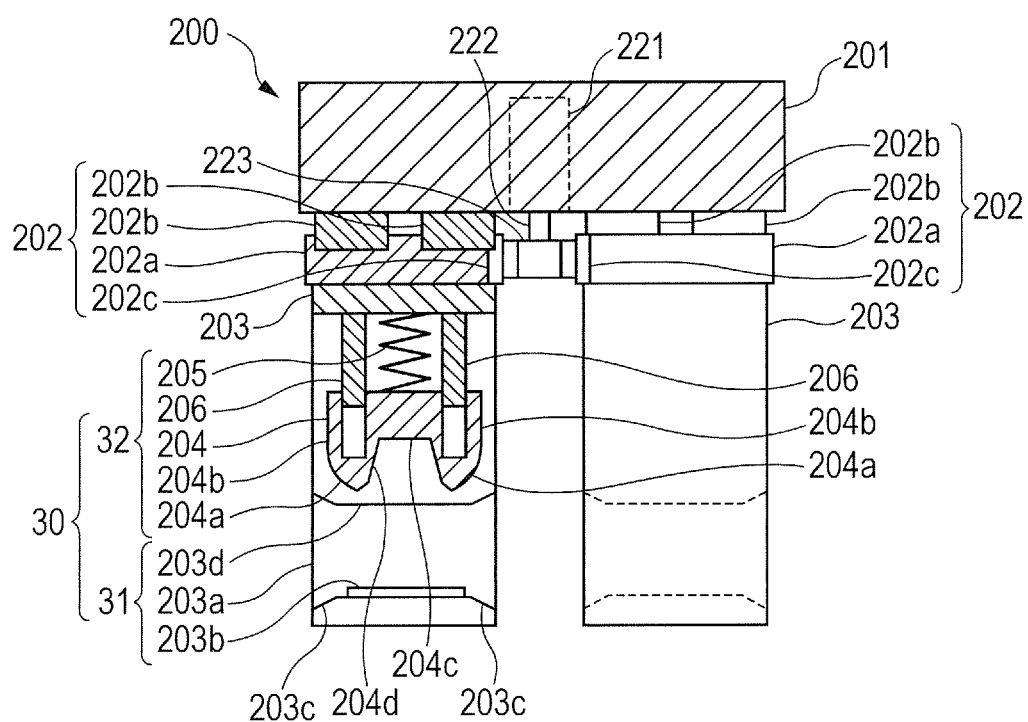
FIG. 24 is a cross-sectional view taken along a line 24-24 in the hand of the robot system of FIG. 22.
Figure 25:
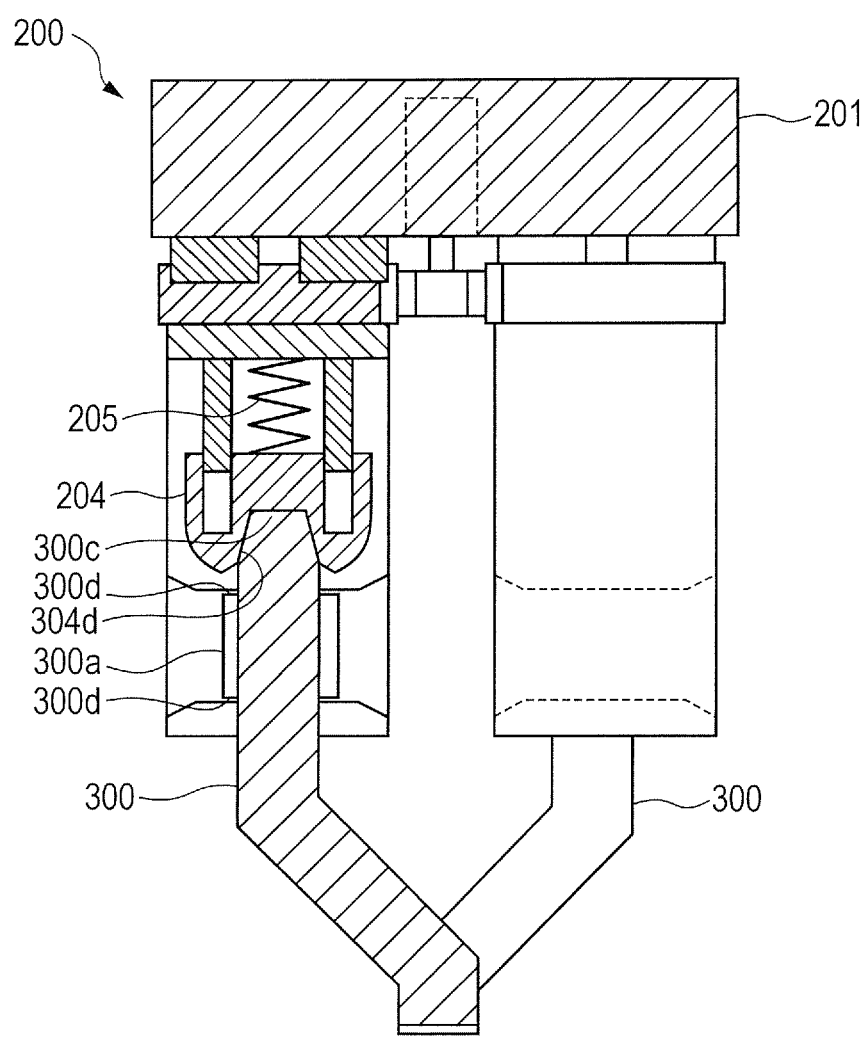
FIG. 25 is a cross-sectional view taken along a line 25-25 in the state where the fingers are attached to the hand of the robot system of FIG. 23.

FIG. 24 and FIG. 25 illustrate a configuration for preventing this in which: each latch 204 is provided with a truncated-conical tapered portion 204d; and, similarly, each first finger 300 is provided with a tapered portion 304d. FIG.

24 is a cross-sectional view taken along a line 24-24 in the hand of the robot system of FIG. 22. FIG. 25 is a cross-sectional view taken along a line 25-25 in the state where the fingers are attached to the hand of the robot system of FIG. 23.

According to this configuration, the fixing portion 204c and the upper portion 300c are not caught by each other and can be fitted to each other to the end, no gap exists after completion of the fitting, and finger mispositioning does not occur. Moreover, when the latch 204 is detached, the fitting can be smoothly cancelled. Further, although not illustrated in FIG. 25, a corner part of the upper portion 300c of the first finger 300 may be formed in a small R-shape and may be chamfered, whereby the fitting can be more smoothly performed.

The above-mentioned configurations do not lead to factors that may hinder such a finger exchange, a tool exchange and a hand exchange as described in Embodiment 1 and Embodiment 2, and exchanging work can be similarly carried out according to the above-mentioned configurations.

As described in Embodiments 1 to 3 hereinabove, the structure for fitting the guiding unit 31 (female dovetails 203a) to the supported portion (male dovetails 310a) for attaching and detaching the operating unit (for example, the finger 300) can be provided. Also as described in Embodiments 1 to 3, the fitting structure can be provided with the concave-convex structure (the concave portions 300b and the convex portions 203b) for restricting the guiding track.

In this way, in order to attach and detach the operating unit (for example, the finger 300), for example, a relatively small-scale fitting structure (the concave-convex structure: the concave portions 300b and the convex portions 203b) can be combined with a relatively large-scale fitting structure (the guiding unit 31 to the supported portion (male dovetails 310a)). Consequently, the guiding track defined by the guiding unit 31 (female dovetails 203a) can be controlled with high accuracy, particularly before and after the predetermined mount position (the fixing portion 204c of the latch 204). Accordingly, in the configuration of the above-mentioned exchanger apparatus, the operating unit (for example, the finger 300) can be smoothly and reliably attached and detached.

For example, the arrangement position and number in the case where the concave-convex structure (the concave portions 300b and the convex portions 203b) is combined with the fitting structure (the guiding unit 31 to the supported portion (male dovetails 310a)) can be arbitrarily changed by those skilled in the art, as is apparent from the description in Embodiment 3. Moreover, depending on conditions of the processing accuracy of the fitting structure (the guiding unit 31 to the supported portion (male dovetails 310a)), the concave-convex structure (the concave portions 300b and the convex portions 203b) does not always need to be provided.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-017010, filed Jan. 30, 2015, and Japanese Patent Application No. 2015-252967, filed Dec. 25, 2015, which are hereby incorporated by reference herein in their entirety.

What is claimed is:

1. A robot apparatus comprising a mounting portion that detachably supports a supported portion of an operating unit that operates an operating object, wherein
the mounting portion includes:
a guiding unit that guides the supported portion so as to enable the supported portion to pass through from one end part of the guiding unit to another end part thereof; and
a lock mechanism that moves the supported portion from the one end part of the guiding unit toward a mount position between the one end part and the another end part, to thereby bring the supported portion into a restricting state at the mount position, and moves the supported portion toward the another end part from the restricting state, to thereby bring the supported portion from the restricting state into a releasing state.

2. The robot apparatus according to claim 1, wherein an opening space of each of the end parts of the guiding unit is larger than a cross-sectional space of the mount position.

3. The robot apparatus according to claim 1, wherein the guiding unit includes, between the guiding unit and the supported portion, a concave structure or a convex structure that restricts a guiding track along which the supported portion moves.

4. The robot apparatus according to claim 3, wherein one of the concave structures or the convex structures included in the guiding unit is provided for each one of the supported portions.

5. The robot apparatus according to claim 3, wherein four of the concave structures or the convex structures included in the guiding unit is provided for each one of the supported portions.

6. The robot apparatus according to claim 1, wherein the mounting portion has a tapered portion formed thereon.

7. The robot apparatus according to claim 6, wherein the supported portion has a tapered portion formed thereon to be fitted to the tapered portion of the mounting portion.

8. The robot apparatus according to claim 1, wherein
the operating unit is fingers of an end effector, and
the fingers are attached and detached with respect to the guiding unit provided to the end effector.

9. The robot apparatus according to claim 8, wherein
a plurality of the guiding units are arranged such that guiding directions of the guiding units are parallel to each other, and
the fingers are respectively attached and detached with respect to the guiding units.

10. The robot apparatus according to claim 1, wherein
the operating unit is an end effector of the robot apparatus, and
the end effector is attached and detached with respect to the guiding unit provided to an arm of the robot apparatus.

11. The robot apparatus according to claim 1, wherein, in one of a case of mounting the operating unit on the mounting portion and a case of removing the operating unit from the mounting portion, a position or orientation of an arm of the robot apparatus is controlled such that a guiding direction of the guiding unit is different from a direction in which a joint of the arm is pivoted.

12. An exchanger apparatus adaptable to a robot apparatus comprising a mounting portion that detachably supports a supported portion of an operating unit that operates an operating object, wherein
the mounting portion includes:
a guiding unit that guides the supported portion so as to enable the supported portion to pass through from one end part of the guiding unit to another end part thereof; and
a lock mechanism that moves the supported portion from any of end parts of the guiding unit toward a mount position between the end parts, to thereby bring the supported portion into a restricting state at the mount position, and moves the supported portion toward any of the end parts from the restricting state, to thereby bring the supported portion from the restricting state into a releasing state,
in a state where the supported portion is guided by the guiding unit, the robot apparatus moves the supported portion and the guiding unit relative to each other, and controls the supported portion into the restricting state via the lock mechanism, to thereby mount the operating unit on the mounting portion, and
in the state where the supported portion is guided by the guiding unit, the robot apparatus moves the supported portion and the guiding unit relative to each other, and controls the supported portion into the releasing state via the lock mechanism, to thereby remove the operating unit from the mounting portion, wherein
the exchanger apparatus comprises a holding unit that holds a second operating unit different from a first operating unit mounted on the mounting portion of the robot apparatus and wherein
through a relative movement between the holding unit and the mounting portion, the exchanger apparatus causes the second operating unit to: enter the guiding unit from one end part thereof; abut against the first operating unit; and push the first operating unit, to thereby cancel a restricting state of the first operating unit by the lock mechanism, and
through the relative movement between the holding unit and the mounting portion, the exchanger apparatus feeds the second operating unit toward the mount position, brings the second operating unit into a restricting state by the lock mechanism, mounts the second operating unit on the mounting portion, and ejects the first operating unit from another end part of the guiding unit.

13. The exchanger apparatus according to claim 12, further comprising a re-holding unit that retrieves the first operating unit removed from the mounting portion and re-holds the retrieved first operating unit at a holding position of the holding unit.

14. A robot system comprising:
a robot apparatus comprising a mounting portion that detachably supports a supported portion of an operating unit that operates an operating object, wherein
the mounting portion includes:
a guiding unit that guides the supported portion so as to enable the supported portion to pass through from one end part of the guiding unit to another end part thereof; and
a lock mechanism that moves the supported portion from any of end parts of the guiding unit toward a mount position between the end parts, to thereby bring the supported portion into a restricting state at the mount position, and moves the supported portion toward any of the end parts from the restricting state, to thereby bring the supported portion from the restricting state into a releasing state,
in a state where the supported portion is guided by the guiding unit, the robot apparatus moves the supported portion and the guiding unit relative to each other, and controls the supported portion into the restricting state via the lock mechanism, to thereby mount the operating unit on the mounting portion, and
in the state where the supported portion is guided by the guiding unit, the robot apparatus moves the supported portion and the guiding unit relative to each other, and controls the supported portion into the releasing state via the lock mechanism, to thereby remove the operating unit from the mounting portion;
an exchanger apparatus adaptable to the robot apparatus, and comprising a holding unit that holds a second operating unit different from a first operating unit mounted on the mounting portion of the robot apparatus, and wherein
through a relative movement between the holding unit and the mounting portion, the exchanger apparatus causes the second operating unit to: enter the guiding unit from one end part thereof; abut against the first operating unit; and push the first operating unit, to thereby cancel a restricting state of the first operating unit by the lock mechanism, and
through the relative movement between the holding unit and the mounting portion, the exchanger apparatus feeds the second operating unit toward the mount position, brings the second operating unit into a restricting state by the lock mechanism, mounts the second operating unit on the mounting portion, and ejects the first operating unit from another end part of the guiding unit; and
a controlling unit configured to control the robot apparatus and the exchanger apparatus.

15. The robot system according to claim 14, wherein, through the relative movement between the holding unit and the mounting portion, the controlling unit exchanges the first operating unit mounted on the robot apparatus for the second operating unit held in the holding unit of the exchanger apparatus.

16. The robot system according to claim 14, wherein the exchanger apparatus further comprises a re-holding unit that retrieves the first operating unit removed from the mounting portion and re-holds the retrieved first operating unit at a holding position of the holding unit.

* * * * *